United States Patent
Ohtani et al.

(10) Patent No.: US 8,379,068 B2
(45) Date of Patent: Feb. 19, 2013

(54) METHOD OF FORMING IMAGE USING HEAT-SENSITIVE TRANSFER IMAGE-RECEIVING SHEET HAVING A LENTICULAR LENS

(75) Inventors: Shigeaki Ohtani, Minami-ashigara (JP); Takashi Shimizu, Fujinomiya (JP); Ryo Imai, Saitama (JP)

(73) Assignee: Fujifilm Corporation, Tokyo (JP)

( * ) Notice: Subject to any disclaimer, the term of this patent is extended or adjusted under 35 U.S.C. 154(b) by 161 days.

(21) Appl. No.: 12/972,940

(22) Filed: Dec. 20, 2010

(65) Prior Publication Data

US 2011/0157293 A1   Jun. 30, 2011

(30) Foreign Application Priority Data

Dec. 25, 2009   (JP) .................................. 2009-296233
Feb. 18, 2010   (JP) .................................. 2010-033839

(51) Int. Cl.
*B41M 5/42*   (2006.01)
*B41J 2/32*   (2006.01)

(52) U.S. Cl. ........................................................ 347/171
(58) Field of Classification Search .................. 347/171, 347/172; 400/120.01
See application file for complete search history.

(56) References Cited

U.S. PATENT DOCUMENTS

| 2011/0064895 | A1* | 3/2011 | Ohtani et al. | .............. 428/32.39 |
| 2011/0200934 | A1* | 8/2011 | Ohtani et al. | ................. 430/213 |
| 2012/0075400 | A1* | 3/2012 | Shinohara | ..................... 347/197 |

FOREIGN PATENT DOCUMENTS

| JP | 06-008523 | 1/1994 |
| JP | 06-282019 | 10/1994 |
| JP | 06-286181 | 10/1994 |
| JP | 09-300828 | 11/1997 |
| JP | 2000-085171 | 3/2000 |
| JP | 2000-094729 | 4/2000 |
| JP | 3609065 | 1/2005 |
| JP | 3789033 | 6/2006 |

OTHER PUBLICATIONS

Extended European Search Report issued Mar. 8, 2011, Application No. 10196454.2.

* cited by examiner

*Primary Examiner* — Huan Tran
(74) *Attorney, Agent, or Firm* — Young & Thompson

(57) ABSTRACT

A method of forming an image, having the steps of: superposing a heat-sensitive transfer sheet on a heat-sensitive transfer image-receiving sheet having a lenticular lens and at least one receptor layer on a transparent support; and applying thermal energy in accordance with image signals from a thermal head, wherein the heat-sensitive transfer image-receiving sheet has a subbing layer which contains a resin that is identical with at least one resin constituting the lenticular lens, on the side of the transparent support opposite to the side on which the lenticular lens is provided, wherein the heat-sensitive transfer image-receiving sheet has the receptor layer containing a latex polymer on the subbing layer and a spherical indenter hardness after the subbing layer and the receptor layer are provided is less than that of the transparent support itself, and wherein the thermal head has a specific length.

8 Claims, 1 Drawing Sheet

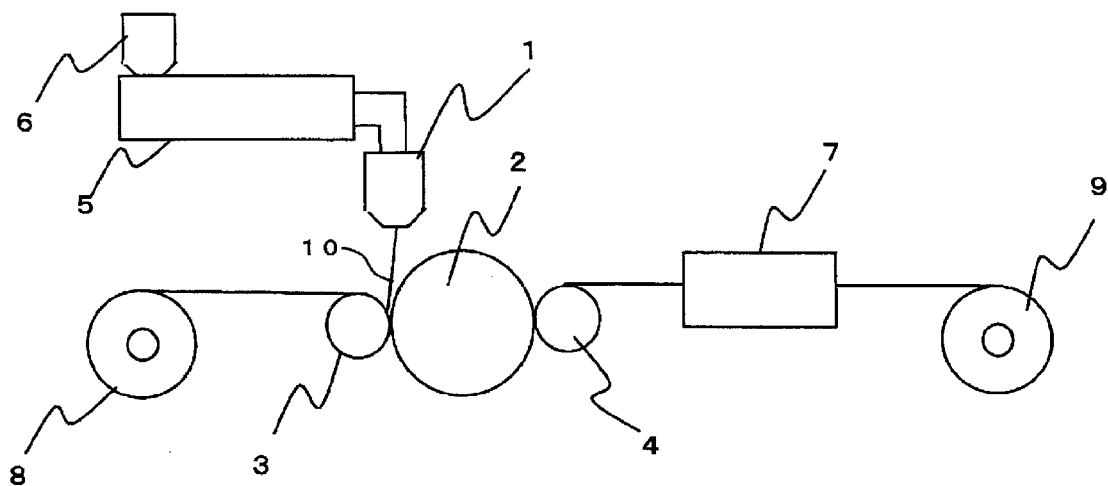

METHOD OF FORMING IMAGE USING HEAT-SENSITIVE TRANSFER IMAGE-RECEIVING SHEET HAVING A LENTICULAR LENS

FIELD OF THE INVENTION

The present invention relates to a method of forming image using a heat-sensitive transfer image-receiving sheet having a lenticular lens, which is used for dye diffusion transfer recording.

BACKGROUND OF THE INVENTION

In a dye diffusion transfer recording system (hereinafter also referred to as a sublimation transfer recording system), a heat-sensitive transfer sheet (hereinafter simply also referred to as an ink sheet) containing a colorant (hereinafter also referred to as a dye) is superposed on a heat-sensitive transfer image-receiving sheet (hereinafter simply also referred to as an image-receiving sheet), and then the heat-sensitive transfer sheet is heated by a thermal head whose exothermic action is controlled by electric signals, in order to transfer the dyes contained in the heat-sensitive transfer sheet to the image-receiving sheet, thereby recording an image information. Three colors: cyan, magenta, and yellow, or four colors which consist of the three colors and black are used for recording a color image by overlapping one color to other, thereby enabling transferring and recording a color image having continuous gradation for color densities.

On the other hand, in recent years, the demands on color images are diversified, and there is a demand for obtaining three-dimensional images conveniently and inexpensively. It has been known that, so as to make a picture, a photograph or the like to appear stereoscopic, a lenticular lens (sheet-shaped, hereinafter also referred to as a lenticular lens sheet) formed from semi-cylindrical lenses is attached on a printed picture or photograph correspondingly to the right-side eye and the left-side eye. In order to make the picture, photograph, or the like appear stereoscopic with high precision in this technique, it is required that the printed images viewed respectively by the right-side eye and the left-side eye are disposed in correspondence with the positions of the respective lenses of the lenticular lens.

Japanese Patent No. 3609065 discloses an image recording apparatus equipped with a recording unit that records an image on the back side of the lenticular lens sheet; a moving mechanism for moving the recording unit and the lenticular lens sheet relatively to each other; a position detecting unit provided to be contacted with the concave parts and/or convex parts of the lenticular lens sheet; and a recording control unit that controls the recording unit to perform recording while detecting the position of the lenticular lens sheet by means of the position detecting unit.

Japanese Patent No. 3789033 and JP-A-9-300828 ("JP-A" means unexamined published Japanese patent application) discloses a method for producing a lenticular lens sheet printed material, including: preparing a heat transfer sheet provided with a coloring material transfer unit and a white layer transfer unit in area order on the same surface of a substrate film; thermally moving the coloring material from the coloring material transfer unit to the back surface of the lenticular lens sheet by using a heating device; and subsequently thermally transferring the white layer on the lenticular lens sheet.

JP-A-6-282019 discloses a heat-sensitive transfer recording sheet for stereoscopic photographs, which utilizes a lenticular lens sheet as a substrate and has a dye receptor layer provided on the back side of the lenticular lens sheet.

Further, in order to obtain high-definition three-dimensional images, it is necessary to print a multi-view image having a high resolution onto a lens arranged in the vertical scanning direction. For reasons such as better picture of the print, a method of shortening a head heater length of a thermal head is disclosed in JP-A-2000-94729, JP-A-6-286181, JP-A-6-8523 and JP-A-2000-85171.

However, in a case in which the thermal head length is shortened so as to obtain the high-definition images, if images are output using the lenticular lens sheet and the heat-sensitive transfer image-receiving sheet as described above, a ribbon gets wrinkled at the image portions of black and high density. As a result, a wrinkle-shaped image defect occurs. Further, a new problem arises such that shortening of the thermal head length makes it easy to have an image defect such as "a shift of the register in the color printing" which means that a yellow color, a magenta color, and a cyan color are misaligned (shifted).

SUMMARY OF THE INVENTION

The present resides in a method of forming an image, having the steps of:

superposing a heat-sensitive transfer sheet on a heat-sensitive transfer image-receiving sheet having a lenticular lens and at least one receptor layer on a transparent support; and applying thermal energy in accordance with image signals from a thermal head, wherein the heat-sensitive transfer image-receiving sheet has a subbing layer which contains a resin that is identical with at least one resin constituting the lenticular lens, on the side of the transparent support opposite to the side on which the lenticular lens is provided, wherein the heat-sensitive transfer image-receiving sheet has the receptor layer containing a latex polymer on the subbing layer and a spherical indenter hardness after the subbing layer and the receptor layer are provided is less than that of the transparent support itself, and wherein the thermal head has a heater length of 45 µm or less.

Other and further features and advantages of the invention will appear more fully from the following description, appropriately referring to the accompanying drawing.

BRIEF DESCRIPTION OF THE DRAWING

FIG. 1 is an example of an overall process chart of an extrusion lamination equipment.

DETAILED DESCRIPTION OF THE INVENTION

According to the present invention, there are provided the following means:

(1) A method of forming an image, having the steps of:

superposing a heat-sensitive transfer sheet on a heat-sensitive transfer image-receiving sheet having a lenticular lens and at least one receptor layer on a transparent support; and applying thermal energy in accordance with image signals from a thermal head, wherein the heat-sensitive transfer image-receiving sheet has a subbing layer which contains a resin that is identical with at least one resin constituting the lenticular lens, on the side of the transparent support opposite to the side on which the lenticular lens is provided, wherein the heat-sensitive transfer image-receiving sheet has the receptor layer containing a latex polymer on the subbing layer and a spherical indenter hardness after the subbing layer and the receptor layer are provided is less than that of the transparent support itself, and wherein the thermal head has a heater length of 45 μm or less.

(2) The method of forming an image as described in the above item (1), wherein said at least one resin that constitutes the lenticular lens and identical with at least one resin that constitutes the subbing layer is a polymethyl methacrylate resin, a polycarbonate resin, a polystyrene resin, a methacrylate-styrene copolymer resin, a polyethylene resin, a polyethylene terephthalate resin, or a glycol-modified polyethylene terephthalate resin.

(3) The method of forming an image as described in the above item (1), wherein said at least one resin that constitutes the lenticular lens and identical with at least one resin that constitutes the subbing layer is a glycol-modified polyethylene-terephthalate resin.

(4) The method of forming an image as described in any one of the above items (1) to (3), wherein at least one of the latex polymer is a copolymer containing a vinyl chloride structure compound as a constituent component.

(5) The method of forming an image as described in any one of the above items (1) to (3), wherein at least one of the polymer latex is a vinyl chloride/acrylic acid ester copolymer.

(6) The method of forming an image as described in any one of the above items (1) to (5), wherein the transparent support is a polyethylene terephthalate resin.

(7) The method of forming an image as described in any one of the above items (1) to (6), wherein the lenticular lens is provided on an adhesive resin layer on the transparent support and the subbing layer is provided on an adhesive resin layer on the transparent support.

(8) The method of forming an image as described in any one of the above items (1) to (7), wherein the receptor layer contains the latex polymer and at least one polyether-modified silicone represented by formula (S1):

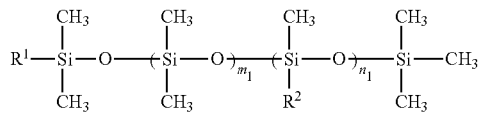

Formula (S1)

wherein $R^1$ represents an alkyl group; $R^2$ represents —X—$(C_2H_4O)_{a1}$—$(C_3H_6O)_{b1}$—$R^3$; $R^3$ represents a hydrogen atom, an acyl group, an alkyl group, a cycloalkyl group or an aryl group; X represents an alkylene group or an alkyleneoxy group; $m_1$ and $n_1$ each independently represents a positive integer; $a_1$ represents a positive integer; and $b_1$ represents 0 or a positive integer.

Hereinafter, the present invention will be described in detail. In the present specification, "to" denotes a range including numerical values described before and after it as a minimum value and a maximum value.

The heat-sensitive transfer image-receiving sheet in the present invention is explained in detail below.

<Heat-Sensitive Transfer Image-Receiving Sheet>

The heat-sensitive transfer image-receiving sheet in the present invention has a lenticular lens and at least one receptor layer on a transparent support, and has a subbing layer formed from a resin that is identical with a resin constituting the lenticular lens, on the side of the transparent support that is opposite to the lenticular lens.

[Support]

A support used in the present invention is a transparent support, and it is preferable that the transparent support has a sheet surface that is as smooth as possible. Further, the support is required to endure the heat of a melt and extruded resin sheet, and a polycarbonate resin, a polysulfone resin, a polyimide resin, a biaxially stretched polyethylene terephthalate resin and the like, which have relatively high heat resistance, may be used for the support. Particularly, a biaxially stretched polyethylene terephthalate resin is preferred from the view point of well smoothness.

Further, in order to make a resin for forming a subbing layer and the lenticular lens more rigidly adhere to the transparent support, it is especially preferable that an adhesive resin is provided, namely an adhesive resin layer is provided, on the transparent support side. Examples of this adhesive resin include a modified polyolefin-series resin, a polyester-series thermoplastic elastomer, and the like. Of these adhesive resins, a modified polyolefin-series resin is preferable. An acid-modified polyolefin resin is more preferable. The acid-modified polyolefin resin is not particularly limited, as long as it is a polyolefin resin modified with an unsaturated carboxylic acid or its derivative. Examples of the unsaturated carboxylic acid include maleic acid, itaconic acid, fumaric acid, and the like. Examples of their derivatives include esters and anhydrides such as maleic acid monoester, maleic acid diester, maleic anhydride, itaconic acid monoester, itaconic acid diester, itaconic anhydride, fumaric acid monoester, fumaric acid diester, and fumaric anhydride. Examples of the above-described polyolefin resin include ethylene-series copolymers such as a straight-chain polyethylene, an ultralow density polyethylene, a high density polyethylene, an ethylene-vinyl acetate (VA) copolymer, an ethylene-ethyl acrylate (EA) copolymer, and an ethylene-methacrylate copolymer, a propylene-series polymer, and a styrene-series elastomer. The acid-modified polyolefin resin may be used singly or in combination of two or more kinds thereof. Further, a polyolefin resin which is not modified by an acid may be blended therewith in such an amount that coexistence of the same is not contrary to the objectives of the present invention.

Specific examples of the acid-modified polyolefin resin include ADMER (trade name, manufactured by Mitsui Chemicals, Inc.), ADTEX (trade name, manufactured by Japan Polyethylene Corporation), POLYBOND (trade name, manufactured by Crompton Corporation) and BONDFAST (trade name, manufactured by SumitomoChemical Co., Ltd.).

As for the adhesive resin, an adhesive resin layer may be formed by providing an adhesive resin on one surface or both surfaces of a transparent thermoplastic resin for forming the transparent support, and subjecting them to co-extrusion. This embodiment is especially preferable in the present invention.

The average thickness of the adhesive resin layer between the transparent support and the lenticular lens resin layer is preferably 5 to 40 μm, more preferably 5 to 30 μm, and particularly preferably 6 to 30 μm.

The average thickness of the adhesive resin layer between the transparent support and the subbing layer is preferably 5 to 20 μm, more preferably 5 to 15 μm, and particularly preferably 6 to 10 μm.

[Subbing Layer]

The subbing layer is provided on the side of the transparent support that is opposite to the side of the transparent support where the lenticular lens is provided. In the present invention, at least one resin that constitutes the subbing layer is identical with at least one resin that constitutes the lenticular lens. If the resin constituting the subbing layer and the resin constituting the lenticular lens respectively include multiple resins, it is preferable that all of the multiple resins are identical with each other.

Examples of the resin that constitutes the subbing layer include a polymethyl methacrylate resin (PMMA), a polycarbonate resin, a polystyrene resin, a methacrylate-styrene copolymer resin (MS resin), an acrylonitrile-styrene copolymer resin (AS resin), a polypropylene resin, a polyethylene resin, a polyethylene terephthalate resin, a glycol-modified polyethylene terephthalate resin, a polyvinyl chloride resin (PVC), a thermoplastic elastomer, or copolymers thereof, a cycloolefin polymer, and the like. Upon considering the ease of melt and extrusion, it is preferable to use a resin having a low melt viscosity, for example, a polymethyl methacrylate resin (PMMA), a polycarbonate resin, a polystyrene resin, a methacrylate-styrene copolymer resin (MS resin), a polyethylene resin, a polyethylene terephthalate resin, or a glycol-modified polyethylene terephthalate resin. On the other hand, upon considering the ease of transfer, difficulty of cracking in the sheet, durability of a pattern and the like, it is more preferable to use a glycol-modified polyethylene terephthalate resin.

(Formation of Subbing Layer)

Formation of the subbing layer on the transparent support is carried out by a step, in which an embossed roller 2 shown in FIG. 1 is changed to a mirror-surface roller. A method of continuously forming a subbing layer by inserting a moving transparent support 8 between the mirror-surface roller 2 and a nip roller 3, extruding a transparent thermoplastic resin 10 from a sheet die 1, to be supplied and laminated thereby between the transparent support 8 and the mirror-surface roller 2, and solidifying the transparent thermoplastic resin 10 by cooling while winding the resin around the mirror-surface roller 2, is preferably used.

Subsequently to the formation of the subbing layer, it is also preferable to coat a receptor layer as described below by using a coating and drying step 7.

[Lenticular Lens]

The resin that constitutes the lenticular lens is preferably the resin that constitutes the subbing layer, and the preferred examples are the same as the preferred examples for the subbing layer.

(Formation of Lenticular Lens)

A method of producing a lenticular lens pattern includes providing a lenticular lens forming resin layer on a sheet 8 (a substrate sheet 8) prepared by forming the subbing layer on the transparent support, or on a sheet 8 prepared by coating a receptor layer that will be described below after the formation of the subbing layer, and forming a fine pattern on the surface of this lenticular lens forming resin layer. The lenticular lens pattern can be preferably produced by a method of continuously transferring a pattern shape onto the surface of a moving sheet, in which the sheet 8 prior to having the lenticular lens resin layer provided thereon is inserted between the embossed roller 2 having the given pattern shape and the nip roller 3, a transparent thermoplastic resin for forming the lenticular lens (a resin sheet 10) and an adhesive resin are co-extruded from the sheet die 1, to be supplied thereby between the embossed roller 2 and the sheet 8 prior to having the lenticular lens resin layer provided thereon, the resins are laminated by being pressed with the nip roller 3, and the laminate is solidified by cooling while being wound around the embossed roller 2. 9 represents a roll of a heat-sensitive transfer image-receiving sheet having thus laminated and formed lenticular lens.

The pattern shape of the lenticular lens resin layer in the present invention may be a conventional pattern shape and is not particularly limited. However, a preferred shape is such that the height of the lens is 60 to 80 µm, the lens pitch is 100 to 318 µm, the radius is 100 to 200 µm, and the thickness of the lens sheet is 200 to 400 µm.

Hereinafter, a preferred method of producing the lenticular lens sheet as described above will be explained in detail.

The lenticular lens sheet as used herein means a sheet having at least a subbing layer, a receptor layer and a lenticular lens resin layer formed thereon. In addition, the lenticular lens sheet may have an adhesive resin layer. In the present invention, the lenticular lens sheet having the adhesive resin layer is a preferable embodiment. A patterned sheet means a sheet having a concavo-convex pattern of the lenticular lens formed thereon.

FIG. 1 is an overall process diagram showing an example of the method of producing a patterned sheet.

As shown in FIG. 1, the method of producing the patterned sheet mainly includes: 1) a raw material step of performing metering and mixing of the raw materials; 2) an extrusion step of continuously extruding a molten resin into a sheet form (band form); 3) a transport step of conveying the sheet prior to having the lenticular lens resin layer provided thereon, which is wound as roll shape; 4) a cooling and transfer step of feeding the extruded resin sheet between the embossed roller and the sheet prior to having the lenticular lens resin layer provided thereon, solidifying by cooling the sheets while laminating the sheets by pressing with a rubber roller, to transfer thereby the pattern shape; 5) a peeling step of peeling the laminated and solidified resin sheet from the embossed roller; and 6) a rolling step of rolling up the obtained sheet into a roll form. In this manner, the lenticular lens resin is laminated, and a concavo-convex pattern of the lens is formed on the laminated resin.

With respect to the sheet prior to having the lenticular lens resin layer provided thereon, at a first step, the subbing layer is coated on the transparent support as described above. In this step, the mirror-surface roller is used in exchange of the above-described embossed roller 2 in FIG. 1. Of the above-described steps, the steps 1), 2) and 6) are common to the method of producing a patterned sheet. The above-described step 3) is a transport step of conveying the transparent support wound at a roll shape. The above-described step 4) is a cooling and transfer step of feeding the extruded resin sheet between the transparent support and the mirror-surface roller, solidifying by cooling the extruded resin sheet while laminating the extruded resin sheet by pressing with a rubber roller. The above-described step 5) is a peeling step of peeling the laminated and solidified resin sheet from the mirror-surface roller. The steps 3) to 5) in the case of coating the subbing layer on the transparent support is only different from the case of coating the lenticular lens resin layer in terms of using the mirror-surface roller in exchange of the embossed roller. Namely, there is only a difference in pattern on the resin and a difference in a sheet prior to coating (a transparent support, or a sheet prior to having the lenticular lens resin layer provided thereon) between these cases. Accordingly, a preferable embodiment of the steps 3) to 5) with respect to the embossed roller as described later is applicable.

Next, on the subbing layer of the thus-obtained sheet (the sheet having a subbing layer formed on a transparent support), a receptor layer is coated and dried. In this manner, a sheet prior to having a lenticular lens resin layer coated thereon, which is used for the production of a patterned sheet as described above, is produced.

In the raw material step, a raw material resin sent from a raw material silo (or a raw material tank) to a vacuum dryer is dried until a predetermined moisture content is reached.

In the extrusion step, the dried raw material resin is fed into an extruder 5 via a hopper 6, and is melted while being kneaded by this extruder 5. The extruder 5 may be any of a single-screw extruder or a multi-screw extruder, and may also have a vent function for creating a vacuum inside the extruder 5. The raw material resin melted by the extruder 5 is sent to the die 1 (for example, a T-die) via a supply duct. At this time, plural extruders may be used to merge at the feed block and form a multilayer. In order to enhance the adhesiveness to the lenticular lens resin layer, an adhesive resin may be disposed between the lenticular lens resin layer and the transparent support. The resin sheet extruded into a sheet form from the die 1 is then sent to the cooling and transfer step.

Here, the sheet 8 prior to having the lenticular lens resin layer provided thereon is conveyed from the transport step and enters the cooling and transfer step between the embossed roller 2 and the nip roller 3. In the cooling and transfer step, the resin sheet 10 extruded from the die is supplied between the embossed roller 2 and the sheet 8 prior to having the lenticular lens resin layer, and is solidified by cooling while being laminated by pressing with the nip roller 3, and thereby the pattern shape is transferred. The solidified patterned sheet is peeled by a peeling roller 4.

On the surface of the embossed roller 2, for example, a reverse shape for molding the patterned sheet is formed. Regarding the material of the embossed roller, various steel members, stainless steel, copper, zinc, brass; products produced by using these metallic materials as core metals and subjecting the materials to plating such as hard chrome plating (HCr plating), Cu plating or Ni plating; ceramics, and various composite materials can be employed.

The nip roller 3 is a roller which is disposed opposite to the embossed roller 2 and is intended to compress the substrate sheet 8 and the resin sheet together with the embossed roller 2. Regarding the material for the nip roller 3, various steel members, stainless steel, copper, zinc, brass, and products produced by using these metallic materials as core metals and providing a rubber lining on the surface thereof, can be employed.

The nip roller 3 is provided with pressing units that are not depicted in the diagram, such that the pressing units can compress the substrate sheet 8 and the resin sheet 10 between the nip roller 3 and the embossed roller 2 with a predetermined pressure. These pressing units are all constructed to apply pressure in the normal line direction at the contact point between the nip roller 3 and the embossed roller 2, and various known units such as a motor-driven unit, an air cylinder and a hydraulic cylinder can be employed.

For the nip roller 3, a construction which is not likely to generate deflection due to the reaction force of the compressing force, can be employed. Examples of such construction that can be employed include a construction of providing a back-up roller which is not depicted in the diagram, on the rear side of the nip roller 3 (opposite side of the embossed roller), a construction of employing a crown shape (a shape having a peak in the middle), a construction of using a roller having a strength distribution such that the hardness at the central part in the direction of the axis of the roller is larger than that of other parts, constructions combining these, and the like.

The peeling roller 4 is a roller which is disposed opposite to the embossed roller 2 and is intended to peel off the sheet on which the concavo-convex pattern of the lenticular lens has been formed, from the embossed roller 2 by winding the patterned sheet around the peeling roller. Regarding the material of the peeling roller, various steel members, stainless steel, copper, zinc, brass, and products produced by using these metallic materials as metal cores and providing a rubber lining on the surface thereof, can be employed.

The temperature of the embossed roller 2 is preferably set such that the temperature of the resin sheet at the compressed part is at or above the glass transition temperature, so that the resin sheet is not cooled and solidified before the transfer to the compressed resin sheet is completed. On the other hand, in the case where the adhesion between the embossed roller and the sheet on which the concavo-convex pattern of the lenticular lens has been formed is too strong in the peeling step using the peeling roller, the patterned sheet peels off irregularly and is deformed into a protruded shape. Therefore, it is preferable to set the temperature of the embossed roller at the lowest possible temperature to achieve transfer. In the case of employing a glycol-modified polyethylene terephthalate resin as the resin material, the surface temperature of the embossed roller can be set at 30 to 90° C., and preferably 40 to 70° C. In order to control the temperature of the embossed roller, a known method such as filling the inside of the embossed roller with a thermal medium (warm water, oil) and circulating the thermal medium, can be employed.

The ejection temperature of the molten resin from the die 1 is preferably set up such that the temperature of the resin sheet at the compressed part is at or above the glass transition temperature, so that the resin sheet is not cooled and solidified before the transfer to the compressed resin sheet is completed. On the other hand, in the case where the adhesion between the embossed roller 2 and the sheet on which the concavo-convex pattern of the lenticular lens has been formed is too strong in the peeling step using the peeling roller 4, the patterned sheet peels off irregularly and is deformed into a protruded shape. Furthermore, since there occur problems such as deterioration of the surface state due to thermal decomposition of the resin, it is preferable to set the ejection temperature at the lowest possible temperature to achieve transfer. In the case of employing a glycol-modified polyethylene terephthalate resin as the resin material, the ejection temperature from the die can be set at 240 to 290° C., and preferably at 250 to 280° C.

[Receptor Layer]

The heat-sensitive transfer image-receiving sheet used in the present invention has at least one receptor layer on the subbing layer.

The receptor layer contains a resin which plays a role of being dyed with a dye migrated from the heat-sensitive transfer sheet and maintaining a formed image. In the present invention, the receptor layer contains at least a latex polymer. It is preferable in the present invention that the heat-sensitive transfer image-receiving sheet have two or more (preferably two layers) receptor layers. According to a preferred embodiment, an undercoat layer may be provided between the subbing layer and the receptor layer so as to impart various functions such as, for example, white background adjustment, charge prevention, adhesiveness, cushion properties and smoothness.

(Latex Polymer)

In the present specification, the latex polymer is a dispersion in which water-insoluble hydrophobic polymers are dispersed as fine particles in a water-soluble dispersion medium. The dispersed state may be one in which spherical polymer-polymerized particles and/or a polymer are emulsified in a dispersion medium, one in which spherical polymer-polymerized particles and/or a polymer underwent emulsion polymerization, one in which spherical polymer-polymerized particles and/or a polymer underwent micelle dispersion, one in which polymer molecules partially have a hydrophilic structure and thus the molecular chains themselves are dispersed in a molecular state, or the like. Among them, spherical polymer-polymerized particles are particularly preferable.

The receptor layer may also use, other than the latex polymer as a receptor polymer which receives the dye migrated from the heat-sensitive transfer sheet and thereby forms a recorded image at the time of heat-sensitive transfer, a latex polymer having the other functions in combination for the purpose of, for example, regulating the elastic modulus of a film.

The average particle diameter of the dispersed particles of the latex polymer used in the receptor layer is preferably 1 to 1,000 nm, particularly preferably 5 to 500 nm.

Examples of the thermoplastic resins used for the latex polymer used in the receptor layer in the present invention include polycarbonates, polyesters, polyacrylates, vinyl chloride, vinyl chloride-series copolymers, polyurethane, styrene-acrylonitrile copolymers, polycaprolactone and the like.

Among them, polyesters, polyacrylate, vinyl chloride, and vinyl chloride-series copolymers are preferable; polyesters, vinyl chloride and vinyl chloride-series copolymers are more preferable; vinyl chloride, vinyl chloride-series copolymers are further preferable; and vinyl chloride-series copolymers are most preferable.

In the present specification, the vinyl chloride copolymer is a copolymer containing a vinyl chloride component as a constituent component, and a copolymer prepared with vinyl chloride as a polymerization monomer and other monomers, and examples thereof include vinyl chloride-vinyl acetate copolymers, vinyl chloride-acrylate copolymers, vinyl chloride-methacrylate copolymers, vinyl chloride-vinyl acetate-acrylate copolymers, and vinyl chloride-acrylate-ethylene copolymers. As described above, the copolymer may be a binary copolymer or a ternary or higher copolymer, and the monomers may be distributed randomly or uniformly by block copolymerization.

In the present invention, among the vinyl chloride copolymers described above, vinyl chloride-acrylate copolymers are preferable.

The copolymers may contain a unit derived from an auxiliary monomer component such as vinylalcohol derivatives, maleic acid derivatives, and vinyl ether derivatives.

It is preferable that the vinyl chloride-series copolymer used in the present invention contains vinyl chloride as a main component. The phrase "contain vinyl chloride as a main component" means that the vinyl chloride component is contained at a proportion of 50% by mole or more, and it is preferable that the vinyl chloride component is contained at a proportion of 50% by mole or more, while auxiliary monomer components such as a maleic acid derivative and a vinyl ether derivative are contained at a proportion of 10% by mole or less.

In the present invention, the latex polymers used in the receptor layer may be used singly or as a mixture of two or more thereof. The latex polymer used in the receptor layer may have a uniform structure or a core/shell structure, and in the latter case, the resins constituting the core and the shell, respectively, may have different glass transition temperatures.

In the present invention, the glass transition temperature (Tg) of the latex polymer used in the receptor layer is preferably −30° C. to 100° C., more preferably 0° C. to 90° C., furthermore preferably 20° C. to 90° C., and particularly preferably 40° C. to 90° C.

The glass transition temperature (Tg), if not practically measurable, may be calculated according to the following formula:

$$1/Tg = \Sigma(Xi/Tgi)$$

wherein, assuming that the polymer is a copolymer composed of n monomers from i=1 to i=n; $Xi$ is a mass fraction of the i-th monomer ($\Sigma Xi=1$); $Tgi$ is a glass transition temperature (measured in absolute temperature) of a homopolymer formed from the i-th monomer; and the symbol $\Sigma$ means the sum of i=1 to i=n. The value of the glass transition temperature of a homopolymer formed from each monomer (Tgi) can be adopted from J. Brandrup and E. H. Immergut, "Polymer Handbook, 3rd. Edition", Wiley-Interscience (1989).

The latex polymer preferably used in the present invention is such that the polymer concentration is preferably 10 to 70% by mass, and more preferably 20 to 60% by mass, based on the latex liquid. The total addition amount of the latex polymer in the receptor layer is such that the solid content of the latex polymer is preferably 50 to 98% by mass, and more preferably 70 to 95% by mass, based on the total amount of the polymer in the receptor layer.

As a preferable embodiment of the latex polymer, latex polymers such as acrylic-series polymers; polyesters; rubbers (e.g., SBR resins); polyurethanes; polyvinyl chloride copolymers including copolymers such as vinyl chloride/vinyl acetate copolymer, vinyl chloride/acrylate copolymer, and vinyl chloride/methacrylate copolymer; polyvinyl acetate copolymers including copolymers such as ethylene/vinyl acetate copolymer; and polyolefins; are preferably used. These latex polymers may be straight-chain, branched, or cross-linked polymers, the so-called homopolymers obtained by polymerizing single type of monomers, or copolymers obtained by polymerizing two or more types of monomers. In the case of the copolymers, these copolymers may be either random copolymers or block copolymers. The molecular weight of each of these polymers is preferably 5,000 to 1,000,000, and further preferably 10,000 to 500,000 in terms of number-average molecular weight.

The latex polymer used in the present invention is preferably exemplified by polyester latex, or any one of vinyl chloride latex copolymers such as vinyl chloride/acrylic compound latex copolymer, vinyl chloride/vinyl acetate latex copolymer, and vinyl chloride/vinyl acetate/acrylic compound latex copolymer, or arbitrary combinations thereof.

Examples of the vinyl chloride-based copolymer latex include VINYBLAN 240, VINYBLAN 270, VINYBLAN 276, VINYBLAN 277, VINYBLAN 375, VINYBLAN 380, VINYBLAN 386, VINYBLAN 410, VINYBLAN 430, VINYBLAN 432, VINYBLAN 550, VINYBLAN 601, VINYBLAN 602, VINYBLAN 609, VINYBLAN 619, VINYBLAN 680, VINYBLAN 680S, VINYBLAN 681N, VINYBLAN 683, VINYBLAN 685R, VINYBLAN 690, VINYBLAN 860, VINYBLAN 863, VINYBLAN 685, VINYBLAN 867, VINYBLAN 900, VINYBLAN 938 and VINYBLAN 950 (trade names, manufactured by Nissin Chemical Industry Co., Ltd.); and SE1320, S-830 (trade names, manufactured by Sumica Chemtex). In the present invention, these are preferable latex polymers.

The latex polymer other than the vinyl chloride-based copolymer latex may include a polyester-based latex polymer. The polyester-based latex polymer is exemplified by Vylonal MD1200, Vylonal MD1220, Vylonal MD1245, Vylonal MD1250, Vylonal MD1500, Vylonal MD1930, Vylonal MD1985 (trade names, manufactured by Toyobo Co., Ltd.).

Among them, vinyl chloride copolymer latexes such as a vinyl chloride/acrylic compound copolymer latex (particularly, a vinyl chloride/acrylic acid ester copolymer latex), a vinyl chloride/vinyl acetate copolymer latex, and a vinyl chloride/vinyl acetate/acrylic compound copolymer latex (particularly, a vinyl chloride/vinyl acetate/acrylic acid ester copolymer latex) are particularly preferred, and a vinyl chloride/acrylic compound copolymer latex is most preferred. In the present invention, it is also preferable to use the latexes in combination of two or more kinds thereof.

In the present invention, in the case where the latex polymer is used in combination of two or more kinds thereof, it is preferable that at least two kinds of the latex polymers are all selected from a vinyl chloride/acrylic acid ester copolymer and a vinyl chloride homopolymer.

In the case where the heat-sensitive transfer image-receiving sheet has two receptor layers, it is preferable that all of these receptor layers contain the respective latexes of vinyl chloride and a vinyl chloride-series copolymer, and it is also preferable that the resin contained in the upper receptor layer has a higher glass transition temperature (Tg) than that of the resin contained in the lower receptor layer (receptor layer on the support side).

(Water-Soluble Polymer)

The image-receiving sheet in the present invention may contain a water-soluble polymer in the receptor layer. A gelatin, a polyvinyl alcohol, a polyvinylpyrrolidone, and polyvinylpyrrolidone copolymers are preferably used. Among them, a gelatin is preferably used, for the reason that a gelatin has good setting property at the time of coating. These water-soluble polymers are effective in controlling hydrophilicity and hydrophobicity of the receptor layer, and in the case where the water-soluble polymer is used in a non-excessive amount, dye transfer from the ink sheet is well, and also, a good transfer density is obtained.

The amount of use of the water-soluble polymer is preferably 0.1 to 10% by mass, and more preferably 0.5 to 5% by mass, relative to the total mass of the solid content in the receptor layer.

(Polyether-Modified Silicone)

In the present invention, it is preferable that the receptor layer contains silicone, and it is preferable that the receptor layer contains a polyether-modified silicone. As the polyether-modified silicone, it is particularly preferable that the receptor layer contains a polyether-modified silicone represented by the following formula (S1).

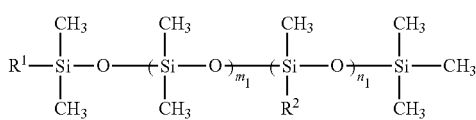

Formula (S1)

In formula (S1), $R^1$ represents an alkyl group; $R^2$ represents $—X—(C_2H_4O)_{a1}—(C_3H_6O)_{b1}—R^3$; $R^3$ represents a hydrogen atom, an acyl group, a monovalent alkyl group, a monovalent cycloalkyl group, and a monovalent aryl group; X represents an alkylene group or an alkyleneoxy group; $m_1$ and $n_1$ each independently represent a positive integer; $a_1$ represents a positive integer; and $b_1$ represents 0 or a positive integer.

The alkyl group represented by $R^1$ may represent a branched alkyl group. The alkyl group represented by $R^1$ is preferably an alkyl group having 1 to 20 carbon atoms, more preferably 1 to 8 carbon atoms, still more preferably 1 to 4 carbon atoms. Among them, a methyl group and an ethyl group are preferable and a methyl group is most preferable.

The acyl group having an acyl moiety represented by $R^3$ includes, for example, an acetyl group, a propionyl group, a buthylyl group, and a benzoyl group. Among these acyl groups, an acyl group having 2 to 20 carbon atoms is preferable and an acyl group having 2 to 10 carbon atoms is more preferable.

The monovalent alkyl group represented by $R^3$ includes, for example, a methyl group, an ethyl group, a propyl group, an isopropyl group, a buthyl group, and a tert-buthyl group. The monovalent alkyl group is preferably a monovalent alkyl group having 1 to 20 carbon atoms, more preferably 1 to 10.

The monovalent cycloalkyl group represented by $R^3$ includes, for example, a cyclopenthyl group and a cyclohexyl group. The monovalent cycloalkyl group is preferably a monovalent cycloalkyl group having 5 to 10 carbon atoms.

The monovalent aryl group represented by $R^3$ includes, for example, a phenyl group and a naphthyl group. An aryl moiety of the monovalent aryl group is preferably a benzene ring.

$R^3$ preferably represents a monovalent alkyl group, preferably a methyl group and a butyl group, particularly preferably a methyl group.

The linking group represented by X is preferably an alkylene group and an alkyleneoxy group. The alkylene group preferably includes, for example, a methylene group, an ethylene group, and a propylene group. The alkyleneoxy group preferably includes, for example, $—CH_2CH_2O—$, $—CH(CH_3)CH_2O—$, $—CH_2CH(CH_3)O—$, and $—(CH_2)_3O—$. The linking group represented by X preferably has 1 to 4 carbon atoms and more preferably 2 or 3.

In addition, X more preferably represents an alkyleneoxy group and particularly preferably a propyleneoxy group $(—(CH_2)_3O—)$.

The above $a_1$ is preferably an integer of 1 or larger, more preferably 1 to 200, and even more preferably 1 to 100. The above $b_1$ is preferably 0 or an integer of 1 or larger, more preferably 0 to 200, and even more preferably 0 to 100. Further, in order to exhibit more effectively the action of preventing separation lines in high-density image areas, by the present invention, it is more preferable that among the values of $a_1$ and $b_1$, $a_1$ is preferably 30 or larger, more preferably 35 or larger, particularly preferably 40 or larger. Herein, the preferably upper limit of $a_1$ is 100 or less. Both of $a_1$ and $b_1$ are 30 or larger, more preferably 35 or larger, particularly preferably 40 or larger. Herein, the preferably upper limit each of $a_1$ and $b_1$ is 100 or less.

In order to more effectively exhibit the action of preventing separation lines in high-density image areas, by the present invention, $m_1$ is preferably 10 to 500, more preferably 30 to 300, and most preferably 50 to 200.

The above $n_1$ is preferably 1 to 50, and more preferably 1 to 20.

The polyether-modified silicone preferably has an average molecular weight of 55,000 or less, and more preferably 40,000 or less. The average molecular weight in the present invention represents a mass average molecular weight. The mass average molecular weight used herein is a molecular weight value obtained by measuring a molecular weight with a GPC analyzer using columns of TSKgel GMHxL, TSKgel G4000HxL and TSKgel G2000HxL (trade names, manufactured by Tosoh Corporation) and then converting the measured value using polystyrene as a reference material; the solvent used for GPC is THF and the detection is conducted by a differential refractometer.

It is preferable that the polyether-modified silicone is a liquid at 25° C.

The polyether-modified silicone is also such that the viscosity thereof is preferably from 500 mPa·s to 10,000 mPa·s, more preferably from 1,000 mPa·s to 5,000 mPa·s, and even more preferably from 2,000 mPa·s to 5,000 mPa·s. The methods for viscosity measurement may be roughly classified into methods of measuring the resistance force exerted to a rotating body in the liquid and methods of measuring the pressure loss occurring when the liquid is passed through an orifice or a capillary. The former methods involve rotary type viscometers, which are represented by a B type viscometer. The latter methods involve capillary viscometers, which are represented by an Ostwald viscometer. In the present invention, the viscosity is defined as a value measured with the B type viscometer at a temperature of 25° C.

The HLB (Hydrophile-Lipophile-Balance) value of the polyether-modified silicone represented by formula (S1) is preferably 4.0 to 8.0, and particularly preferably 4.5 to 6.5. If the HLB value is too low, failure in the surface state is likely to occur. If the HLB value is too high, the ability of preventing the generation of separation lines is decreased.

In the present invention, the HLB value is determined by a calculation formula defined by the following expression based on the Griffin's method ("Kaimennkasseizaibinnrann (Handbook of Surfactant)," co-authored by Ichiro Nishi, Tooziro Imai and Masai Kasai, published by Sangyo Tosho Co., Ltd., 1960).

$$HLB = 20 \times Mw/M$$

Here, M represents the molecular weight, and Mw represents the formula weight (molecular weight) of the hydrophilic moiety. In addition, M=Mw+Mo, wherein Mo is the formula weight (molecular weight) of the lipophilic moiety. The hydrophilic moiety in this case is an alkyleneoxy group.

Specific examples of the polyether-modified silicone oil preferably used in the present invention include KF-351A, KF-352A, KF-353, KF-354L, KF-355A, KF-615A, KF-945, KF-640, KF-642, KF-643, KF-6020, KF-6011, KF-6012, KF-6015, KF-6017, X-22-4515, and X-22-6191, manufactured by Shin-Etsu Chemical Co., Ltd.; SH3749, SH3773M, SH8400, SF8427, SF8428, FZ-2101, FZ-2104, FZ-2110, FZ-2118, FZ-2162, FZ-2203, FZ-2207, FZ-2208, FZ-77, L-7001, and L-7002, manufactured by Dow Corning Toray Co., Ltd. (all trade names).

The polyether-modified silicone oil preferably used in the present invention can be easily synthesized by the methods described in, for example, JP-A-2002-179797, JP-A-2008-1896, and JP-A-2008-1897, or methods equivalent to these methods.

In the present invention, the polyether-modified silicone oil can be used singly, or in combination of two or more kinds thereof can also be used. Also, in the present invention, a releasing agent may be used in combination with the polyether-modified silicone oil.

The addition amount of the polyether-modified silicone oil is preferably 1% by mass to 20% by mass (solid content %), and more preferably 1% by mass to 10% by mass (solid content %), based on the total amount of the latex polymer in the receptor layer.

The coating amount of the receptor layer in the present invention is preferably 0.5 to 10.0 g/m², and more preferably 1.0 to 8.0 g/m². The term "coating amount" in the present specification is a value calculated in terms of the solid content, unless particularly stated otherwise.

(Surfactant)

In the present invention, it is preferable that the receptor layer contains a surfactant. The surfactant is preferably an anionic surfactant or a nonionic surfactant, and is more preferably an anionic surfactant.

Among the anionic surfactants, it is more preferable that the receptor layer contains at least one anionic surfactant represented by the following formula (A1) or (A2). In order to greatly exhibit the effects of the present invention, a compound represented by the following formula (A1) is particularly preferable.

Formula (A1)

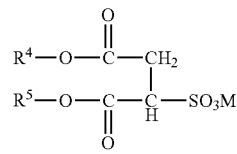

In formula (A1), $R^4$ and $R^5$ each independently represent an alkyl group having 3 to 20 carbon atoms, preferably an alkyl group having 4 to 10 carbon atoms, and more preferably a branched alkyl group having 4 to 10 carbon atoms. $R^4$ and $R^5$ each particularly preferably are a 2-ethylhexyl group.

In formula (A1), M represents a hydrogen atom or a cation. Preferred examples of the cation represented by M include an alkali metal ion (e.g., a lithium ion, a sodium ion, a potassium ion), an alkaline-earth metal ion (e.g., a barium ion, a calcium ion), and an ammonium ion. Among these, a lithium ion, a sodium ion, a potassium ion and an ammonium ion are more preferred; and a lithium ion, a sodium ion and a potassium ion are particularly preferred.

Formula (A2)

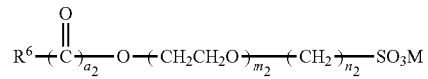

In formula (A2), $R^6$ represents an alkyl group or an alkenyl group, each having 6 to 20 carbon atoms; preferably an alkyl group or an alkenyl group, each having 10 to 20 carbon atoms; and most preferably an alkyl group or an alkenyl group, each having 14 to 20 carbon atoms.

$R^6$ may represent a branched, alkyl or alkenyl group.

In formula (A2), M represents a hydrogen atom or a cation. Preferred examples of the cation represented by M include an alkali metal ion (e.g., a lithium ion, a sodium ion, a potassium ion), an alkaline-earth metal ion (e.g., a barium ion, a calcium ion), and an ammonium ion. Among these, a lithium ion, a sodium ion, a potassium ion and an ammonium ion are more preferred; and a lithium ion, a sodium ion and a potassium ion are particularly preferred.

$m_2$ represents the average number of added moles, and is preferably larger than 0 and equal to or less than 10. $m_2$ is more preferably 1 to 6, and most preferably 2 to 4.

$n_2$ represents an integer from 0 to 4, and is particularly preferably 2 to 4.

$a_2$ represents 0 or 1, and is particularly preferably 0.

Specific examples of the compound are described below. However, the anionic surfactant used in the present invention should not be construed as being limited to the below-described specific examples.

A1-1 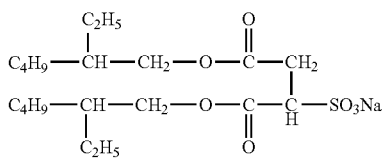

A1-2 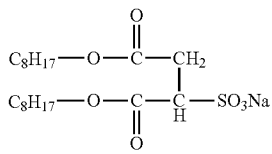

A1-3 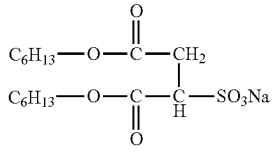

A1-4 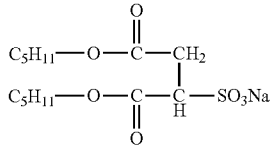

A1-5 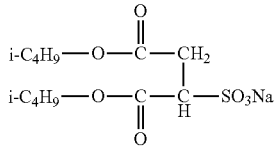

A1-6 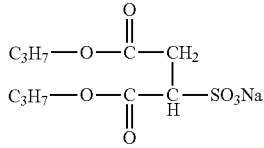

A1-7 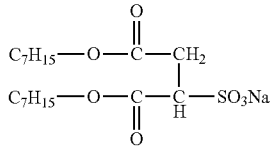

A1-8 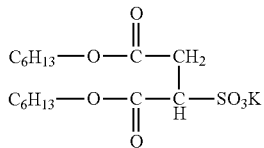

A1-9 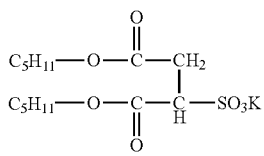

A1-10 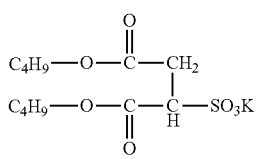

-continued

A2-1
$$C_{14}H_{29}-O-(CH_2CH_2O)_{\overline{3}}-(CH_2)_{\overline{4}}-SO_3Na$$

A2-2
$$C_{10}H_{21}-O-(CH_2CH_2O)_{\overline{3}}-(CH_2)_{\overline{4}}-SO_3Na$$

A2-3
$$C_{13}H_{27}-\overset{O}{\underset{\|}{C}}-O-(CH_2CH_2O)_{\overline{3}}-(CH_2)_{\overline{4}}-SO_3Na$$

A2-4
$$C_{12}H_{25}-\overset{O}{\underset{\|}{C}}-O-(CH_2CH_2O)_{\overline{4}}-(CH_2)_{\overline{3}}-SO_3K$$

A2-5
$$C_8H_{17}-O-(CH_2CH_2O)_{\overline{2}}-(CH_2)_{\overline{4}}-SO_3Na$$

A2-6
$$C_{12}H_{25}-O-(CH_2CH_2O)_{\overline{4}}-(CH_2)_{\overline{4}}-SO_3Na$$

A2-7
$$C_{18}H_{35}-O-(CH_2CH_2O)_{\overline{8}}-(CH_2)_{\overline{3}}-SO_3Na$$

The anionic surfactant represented by formula (A1) or (A2) not only contributes to stabilization of the surface state by imparting wettability to the coating liquid, but also suppresses the generation of separation lines in the high-density image areas by using in combination with the polyether-modified silicone represented by formula (S1). The anionic surfactant also has an effect of preventing gloss unevenness.

The anionic surfactant represented by formula (A1) or (A2) may be incorporated into any layer such as a heat insulation layer or an intermediate layer, in addition to the receptor layer.

The total coating amount of the anionic surfactant represented by formula (A1) or (A2) is preferably from 5 mg/m² to 500 mg/m², and more preferably from 10 mg/m² to 200 mg/m².

Furthermore, in the present invention, other various surfactants such as anionic, nonionic and cationic surfactants may also be used in combination in the receptor layer.

A preferred example of the other surfactants that may be used in combination with the anionic surfactant represented by formula (A1) or (A2) is a fluorine-containing compound represented by the following formula (H).

$$MO_3S-L_b-\underset{\underset{CH_2CO_2-CH_2-(CF_2)_{m3}-H}{|}}{CH}-CO_2-CH_2-(CF_2)_{m3}-H \qquad \text{Formula (H)}$$

In formula (H), $m_3$ and $n_3$ each independently represents an integer of 2 to 8, preferably 2 to 6, further preferably 3 to 6. The total value of $m_3$ and $n_3$ is preferably 6 or more to 12 or less, more preferably 6 or more to 10 or less. Among them, m3 and n3 are preferably the same, and most preferably m3 and n3 is 4.

Preferred examples of the cation represented by M include an alkali metal ion (e.g., a lithium ion, a sodium ion, a potassium ion), an alkaline-earth metal ion (e.g., a barium ion, a calcium ion), and an ammonium ion. Among these, a lithium ion, a sodium ion, a potassium ion and an ammonium ion are more preferred; and a lithium ion, a sodium ion and a potassium ion are particularly preferred.

$L_b$ represents an alkylene group, which is a single bond. In a case where $L_b$ represents an alkylene group, the alkylene group is preferably an alkylene group having 2 or less carbon atoms, more preferably a methylene group. It is the most preferable that $L_b$ is a single bond.

It is preferable to combine the above preferable embodiments each other in formula (H).

The specific examples of a compound represented by formula (H) are described below. However, the compound represented by formula (H) that can be used in the present invention is not limited thereto. In the following descriptions on the structure of the example compounds, unless particularly stated otherwise, the alkyl group and perfluoroalkyl group mean groups having a linear structure.

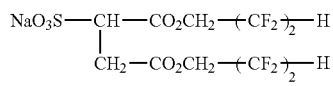
(H)-1

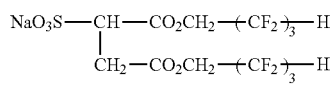
(H)-2

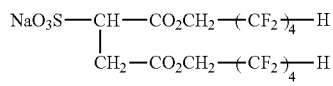
(H)-3

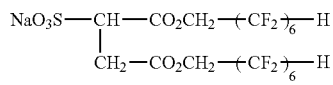
(H)-4

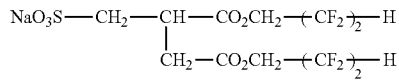
(H)-5

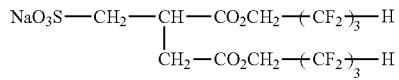
(H)-6

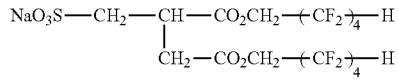
(H)-7

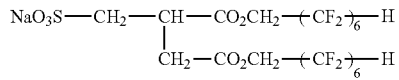
(H)-8

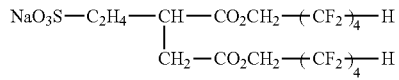
(H)-9

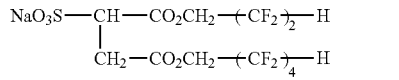
(H)-10

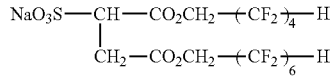
(H)-11

The coating amount of the fluorine-containing compound represented by formula (H) is preferably from 0.5 mg/m² to 50 mg/m², and more preferably from 1 mg/m² to 20 mg/m² in the layer added with the compound.

(Other Additive)

The receptor layer in the present invention may contain an additive, according to the necessary. Examples of the additive include an ultraviolet absorbent, an antiseptic agent, a film-forming aid, a film-hardening agent, a matting agent (including a lubricating agent), an oxidation inhibitor, and other additives.

(Ultraviolet Absorbent)

The heat-sensitive transfer image-receiving sheet in the present invention may contain any ultraviolet absorbent. As the ultraviolet absorbents, use can be made of typical inorganic or organic ultraviolet absorbents. As the organic ultraviolet absorbents, use can be made of non-reactive ultraviolet absorbents such as salicylate-series, benzophenone-series, benzotriazole-series, triazine-series, substituted acrylonitrile-series, and hindered amine-series ultraviolet absorbents; copolymers or graft polymers of thermoplastic resins (e.g., acrylic resins) obtained by introducing an addition-polymerizable double bond (e.g., a vinyl group, an acryloyl group, a methacryloyl group), or an alcoholic hydroxyl group, an amino group, a carboxyl group, an epoxy group, or an isocyanate group, to the non-reactive ultraviolet absorbents, subsequently copolymerizing or grafting. In addition, disclosed is a method of dissolving ultraviolet absorbents in a monomer or oligomer of the resin to be used and then polymerizing the monomer or oligomer (JP-A-2006-21333), and the ultraviolet-shielding resins obtained by this method can be used. In this case, the ultraviolet absorbents may be non-reactive.

Of these ultraviolet absorbents, preferred are benzophenone-series, benzotriazole-series, and triazine-series ultraviolet absorbents. It is preferred that these ultraviolet absorbents are used in combination so as to cover an effective ultraviolet absorption wavelength region according to the properties of the dye that is used for image formation. Besides, in the case of non-reactive ultraviolet absorbents, it is preferred to use a mixture of two or more kinds of ultraviolet absorbents each having a different structure from each other so as to prevent the ultraviolet absorbents from precipitation.

Examples of commercially available ultraviolet absorbents include TINUVIN-P (trade name, manufactured by Ciba-Geigy), JF-77 (trade name, manufactured by JOHOKU CHEMICAL Co., Ltd.), SEESORB 701 (trade name, manufactured by SHIRAISHI CALCIUM KAISHA, Ltd.), SUMISORB 200 (trade name, manufactured by Sumitomo Chemical Co., Ltd.), VIOSORB 520 (trade name, manufactured by KYODO CHEMICAL Co., Ltd.), and ADKSTAB LA-32 (trade name, manufactured by ADEKA).

(Antiseptic)

To the heat-sensitive transfer image-receiving sheet in the present invention, antiseptics may be added. The antiseptics that may be contained in the image-receiving sheet in the present invention are not particularly limited. For example, use can be made of materials described in Bofubokabi (Preservation and Antifungi) HAND BOOK, Gihodo shuppan (1986), Bokin Bokabi no Kagaku (Chemistry of Anti-bacteria and Anti-fungi) authored by Hiroshi Horiguchi, Sankyo Shuppan (1986), Bokin Bokabizai Jiten (Encyclopedia of Antibacterial and Antifungal Agent) edited by The Society for Antibacterial and Antifungal Agent, Japan (1986). Examples thereof include imidazole derivatives, sodium dehydroacetate, 4-isothiazoline-3-on derivatives, benzoisothiazoline-3-on, benzotriazole derivatives, amidineguanidine derivatives, quaternary ammonium salts, pyrrolidine, quinoline, guanidine derivatives, diazine, triazole derivatives, oxazole, oxazine derivatives, and 2-mercaptopyridine-N-oxide or its salt. Of these antiseptics, 4-isothiazoline-3-on derivatives and benzoisothiazoline-3-on are preferred.

(Film-Forming Aid)

It is preferable to add a high boiling point solvent to the heat-sensitive transfer image-receiving sheet in the present invention. The high boiling point solvent is an organic compound (typically, an organic solvent) which functions as a film-forming aid or a plasticizer, and lowers the lowest film-forming temperature of the latex polymer, and such solvents are described in, for example, "Gosei Latex no Kagaku (Chemistry of Synthetic Latex)", Soichi Muroi, issued by Kobunshi Kanko Kai (1970). Examples of the high boiling point solvent (film-forming aid) include the following compounds.

Z-1: Benzyl alcohols

Z-2: 2,2,4-Trimethylpentanediol-1,3-monoisobutyrates

Z-3: 2-Dimethylaminoethanols

Z-4: Diethylene glycols

When these high boiling point solvents are added to the image-receiving sheet, spread of image is observed, and there is an undesirable case for practical use. However, if the content of the solvent in the coating film is not too large, there is no problem in terms of performance.

(Hardening Agent)

The heat-sensitive transfer image-receiving sheet of the present invention may contain a hardening agent (hardener). The hardening agent may be added to a coated layer(s) of the heat-sensitive transfer image-receiving sheet.

Preferable examples of the hardener that can be used in the present invention include H-1, 4, 6, 8, and 14 in page 17 of JP-A-1-214845; compounds (H-1 to H-54) represented by any one of formulae (VII) to (XII) in columns 13 to 23 of U.S. Pat. No. 4,618,573; compounds (H-1 to H-76) represented by formula (6) in the lower right on page 8 of JP-A-2-214852, (particularly, H-14); and compounds described in Claim 1 of U.S. Pat. No. 3,325,287. Examples of the hardening agent include hardening agents described, for example, in column 41 of U.S. Pat. No. 4,678,739, U.S. Pat. No. 4,791,042, JP-A-59-116655, JP-A-62-245261, JP-A-61-18942, and JP-A-4-218044. More specifically, an aldehyde-series hardening agent (formaldehyde, etc.), an aziridine-series hardening agent, an epoxy-series hardening agent, a vinyl sulfone-series hardening agent (N,N'-ethylene-bis(vinylsulfonylacetamido) ethane, etc.), an N-methylol-series hardening agent (dimethylol urea, etc.), a boric acid, a metaboric acid, or a polymer hardening agent (compounds described, for example, in JP-A-62-234157), can be mentioned. Preferable examples of the hardener include a vinyl sulfone-series hardener and chlorotriazines.

(Matting Agent)

To the heat-sensitive transfer image-receiving sheet in the present invention, a matting agent may be added in order to prevent blocking, or to give a release property or a sliding property. The matting agent may be added on the same side as the coating side of the receptor layer of the image-receiving sheet. In detail, the matting agent may be added to the receptor layer, a white layer, a heat transferable protective layer, and the like.

Examples of the matting agent generally include fine particles of water-insoluble organic compounds and fine particles of water-insoluble inorganic compounds. In the present invention, the organic compound-containing fine particles are preferably used from the viewpoints of dispersion properties. In so far as the organic compound is incorporated in the particles, there may be organic compound particles consisting of the organic compound singly, or alternatively organic/inorganic composite particles containing not only the organic compound but also an inorganic compound. As the matting agent, there can be used organic matting agents described in, for example, U.S. Pat. Nos. 1,939,213, 2,701,245, 2,322,037, 3,262,782, 3,539,344, and 3,767,448.

[Method of Producing Receptor Layer]

Hereinafter, the method of producing the receptor layer in the present invention will be explained.

The receptor layer in the present invention is preferably an aqueous type (water-based) coating. The "aqueous type" here means that 60% by mass or more of the solvent (dispersion medium) of the coating liquid is water. As a component other than water in the coating liquid, a water miscible organic solvent may be used. Examples thereof include methyl alcohol, ethyl alcohol, isopropyl alcohol, methyl cellosolve, ethyl cellosolve, dimethylformamide, ethyl acetate, diacetone alcohol, furfuryl alcohol, benzyl alcohol, diethylene glycol monoethyl ether, and oxyethyl phenyl ether.

In the case of coating two or more receptor layers and other functional layers on the subbing layer of the transparent support, it is known to produce the layers by sequentially coating the each layers over and over, or by coating the each layers in advance on the support and adhering the assemblies, as disclosed in JP-A-2004-106283, JP-A-2004-181888, JP-A-2004-345267, and the like. It has been known in photographic industries, on the other hand, that productivity can be greatly improved, for example, by providing plural layers through simultaneous multi-layer coating. For example, there are known methods, such as the so-called slide coating (slide coating method) and curtain coating (curtain coating method), as described in, for example, U.S. Pat. Nos. 2,761,791, 2,681,234, 3,508,947, 4,457,256 and 3,993,019; JP-A-63-54975, JP-A-61-278848, JP-A-55-86557, JP-A-52-31727, JP-A-55-142565, JP-A-50-43140, JP-A-63-80872, JP-A-54-54020, JP-A-5-104061, JP-A-5-127305, and JP-B-49-7050 ("JP-B" means examined Japanese patent application); and Edgar B. Gutoff, et al., "Coating and Drying Defects: Troubleshooting Operating Problems", John Wiley & Sons, 1995, pp. 101-103. According to these coating methods, two or more kinds of coating liquids are fed simultaneously into a coater and formed into two or more different layers.

The method of producing the receptor layer in the present invention is preferably carried out by slide coating or curtain coating. Even in the case of coating plural layers, coating of these layers can be carried out by the simultaneous multilayer-coating, and high productivity can be realized.

Here, in the case of performing the simultaneous multilayer-coating, it is necessary to adjust the viscosity and surface tension of the coating liquid, from the viewpoint of forming a uniform coating film and obtaining satisfactory coatability. The viscosity of the coating liquid can be easily adjusted using usual thickeners or viscosity reducers in such a degree that they do not affect to other performances. Beside, the surface tension of the coating liquid can be adjusted using various kinds of surfactants.

The temperature of these coating liquids for coating various layers is preferably 25° C. to 60° C., and more preferably 30° C. to 50° C. Particularly, the temperature of the coating liquids in the case of using gelatin in the coating liquid is preferably 33° C. to 45° C.

In the present invention, the coating amount of the coating liquid for a layer is preferably in the range of 1 $g/m^2$ to 500 $g/m^2$. The number of layers in the multilayer constitution can be arbitrarily selected to be two or more. It is preferable that the receptor layer is provided as a layer disposed farthest from the support.

In a drying zone, drying proceeds through: the constant rate period of drying, in which the drying rate is constant, and the material temperature is approximately equal to a wet-bulb temperature; and a falling rate period of drying, in which the drying rate are slowed, and the material temperature rises. In the constant rate drying period, any heat supplied from an external source is all used in the evaporation of moisture. In the falling rate drying period, moisture diffusion inside the material becomes rate-limiting, and the drying rate is lowered due to recession of the evaporation surface or the like. The supplied heat is used in the rising of the material temperature.

In a setting zone and the drying zone, moisture migration occurs between the respective coated films (coated layers) and between the support and the coated films, and solidification also occurs due to cooling of the coated films and moisture evaporation. For those reasons, the quality and performance of the resultant product is greatly influenced by the processing history, such as the layer surface temperature during drying and the drying period of time, and it is required to set the conditions in accordance with the demanded quality.

The temperature of the setting zone is 15° C. or below, and it is preferable to set the cooling step time period in the range from 5 seconds or more to less than 30 seconds. If the cooling time period is too short, a sufficient increase of the coating liquid viscosity cannot be obtained, and the surface state is deteriorated upon the subsequent drying step. On the other hand, if the cooling time period is too long, the removal of moisture in the subsequent drying step takes time, and the production efficiency is decreased.

After the cooling step at 15° C. or below, drying is carried out in an environment at above 15° C. In that case, in the present invention, it is preferable to adjust the amount of evaporation of water in the coated films that have been coated in multiple layers within 30 seconds after the completion of cooling, to 60% or more of the amount of moisture contained at the layer surface smeared per an area of 1 $m^2$ immediately after coating. The terms "amount of moisture contained at the layer surface smeared per an area of 1 $m^2$ immediately after coating", is equal to the water content in the coating liquid prepared before the coating. When the amount of evaporating moisture is not so small, moisture is present on the coated surface not in excess, and the surface state is satisfactory. On the other hand, in the case of adjusting the amount of evaporation to 60% or more, when the drying temperature is set to a temperature not so higher than 50° C., the evaporation of moisture does not occur rapidly, without causing cracking or the like, and the surface state is satisfactory. Thus, it is preferable to control the drying temperature to 50° C. or below.

Determination of the amount of evaporation can be carried out such that the mass obtained by drying the heat-sensitive transfer image-receiving sheet after coating under the condition (atmosphere) of 110° C. for one hour, is defined as the mass after 100% of moisture is evaporated, and the difference between the masses before and after drying are measured.

Furthermore, from the viewpoint of enhancing the scratch resistance of the receptor layer, it is preferable to form the receptor layer by carrying out the final drying step under an environment at a temperature of 120° C.

The coat-finished product which has been dried is adjusted to have a certain water content, followed by winding up. Since the progress of film hardening is affected by the water content and temperature during the storage of the wound, coat-finished product, it is necessary to set the conditions for humidification step that are appropriate for the water content in a wound-up state.

In general, the film-hardening reaction can be carried out more easily at higher temperature and higher humidity conditions. However, if the water content is too high, adhesion between the coated products may occur, or there may be a problem in terms of performance. For this reason, it is necessary to set the water content in the wound-up state (humidification conditions) and the storage conditions in accordance with the product quality.

Typical drying devices include an air-loop system and a helical system. The air-loop system is a system in which drying blasts are made to blow on the coat-finished product supported by rollers, and wherein a duct may be mounted either longitudinally or transversely. Such a system has a high degree of freedom in setting of the volume of drying wind, because a drying function and a transporting function are basically separated therein. However, many rollers are used therein, so base-transporting failures, such as gathering, wrinkling and slipping, tend to occur. The helical system is a system in which the coat-finished product is wound round a cylindrical duct in a helical fashion, and transported and dried as it is floated by drying wind (air floating). So no support by rollers is basically required (JP-B-43-20438). In addition to those, there is available a drying system which conveys by reciprocally installing upper and lower ducts and conveying the coat-finished product. In general, this system has a better dryness distribution than that of the helical system, but is poor in floatability.

[Method of Measuring Spherical Indenter Hardness]

In the present invention, a spherical indenter hardness, after the subbing layer and the receptor layer are provided on the transparent support, is less than that of the transparent support itself. As an indicator of hardness, an automatic micro-Vickers hardness tester (trade name: HMV-FA, manufactured by Shimadzu Corporation) is used, in which the Vickers indenter is changed to a spherical indenter having a diameter of 0.2 mm, and the indenter is put on a sample and then the sample is subjected to weight bearing of 200 mN over a period of 10 seconds, and thereafter the weight is reduced to 0 over a period of 10 seconds. A maximum amount of displacement ($\mu$m) of the sample at this time is measured. The less the amount of displacement, the higher the hardness is.

The spherical indenter hardness, after the subbing layer and the receptor layer are provided on the transparent support, may be adjusted by installment of the subbing layer and the adhesion resin layer for adhering the subbing layer to the transparent support, materials that are used in these layers, and materials that are used in the receptor layer. Such adjustment may be achieved by a combination of preferable matters, as already described.

<Heat-Sensitive Transfer Sheet>

In the heat-sensitive transfer image-receiving sheet in the present invention, the dye is transferred by the heat-sensitive transfer sheet to form an image, and then a white layer (white transfer layer) is transferred. The heat-sensitive transfer sheet for transferring the dye and the heat-sensitive transfer sheet for transferring the white layer may be an integrated sheet or may be separate sheets. It is also acceptable to transfer a heat transferable protective layer after the white layer is transferred.

The integrated heat-sensitive transfer sheet is a sheet obtained by providing (forming), in area order, on a support such as polyethylene terephthalate (PET), dye layers (colorant layers) prepared by dispersing dyes of three colors, such as yellow, magenta and cyan, respectively in a binder resin, and a white layer. In the case of the separate sheets, for the sheet for dye transfer, use is made of a sheet obtained by providing, in area order, on the support such as described above, dye layers prepared by dispersing dyes of three colors, such as yellow, magenta and cyan, respectively in a binder resin, while for the sheet for a white layer transfer, a sheet obtained by providing a white layer on the support such as described above is used.

The term "forming layers in area order" as used in the present specification means forming dye layers each having a different hue and/or function layers in the longitudinal direction on the support of the heat-sensitive transfer sheet, by applying them separately in order.

Examples include the case in which a yellow dye layer, a magenta dye layer, and a cyan dye layer are formed in this order in the longitudinal direction on the support.

Further, any arrangement of these dye layers can be employed, but it is preferred that a yellow dye layer, a magenta dye layer, and a cyan dye layer be arranged sequentially in this order on the support.

Here, upon the dye transfer, an embodiment in which the dye layers are constituted of four colors, including black in addition to the three colors, is also acceptable.

In the case of transferring the protective layer, in the integrated heat-sensitive transfer sheet, a heat-transferable protective layer may be provided after providing the white layer. In the case of the separate sheets, the heat-transferable protective layer may be provided in area order on a heat-sensitive transfer sheet provided with the white layer, or a sheet having the heat-transferable protective layer provided on another sheet may be used.

Furthermore, in the integrated heat-sensitive transfer sheet, the heat-transferable protective layer may be provided before providing the white layer. In the case of separate sheets, a heat-sensitive transfer sheet obtained by providing the respective dye layers of three colors, such as yellow, magenta and cyan, and the heat-transferable protective layer in area order, and the heat-sensitive transfer sheet provided with the white layer may be combined. In this case, the protective layer is formed on the receptor layer, and the white layer is transferred onto this protective layer.

Here, it is preferable for all of the heat-sensitive transfer sheets to have a heat resistant lubricating layer on the side of the support opposite to the side where the dye layer, white layer or heat-transferable protective layer is provided.

[Support]

Conventionally known supports can be used as the support. For example, a polyamide film, a polyimide film, and a polyester film may be mentioned. Among these, a polyester film is preferred, and examples of the polyester film include polyethylene terephthalate (PET) and polyethylene naphthalate (PEN), and polyethylene terephthalate is preferred.

The thickness of the support can be properly determined in accordance with the material of the support so that the mechanical strength, the heat resistance, and the like become optimum. Specifically, it is preferred to use a support having a thickness of about 1 μm to about 100 μm, more preferably from about 2 μm to 50 μm, and further preferably from about 3 μm to about 10 μm.

[Dye Layer (Colorant Layer)]

(Binder Resin)

Examples of a binder resin used in the dye layer include acrylic resins such as polyacrylonitrile, polyacrylate, and polyacrylamide; polyvinyl acetal-series resins such as polyvinyl acetoacetal, and polyvinyl butyral; cellulose-series resins such as ethylcellulose, hydroxyethylcellulose, ethylhydroxycellulose, hydroxypropylcellulose, ethylhydroxyethylcellulose, methylcellulose, cellulose acetate, cellulose acetate butyrate, cellulose acetate propionate, cellulose nitrate, other modified cellulose resins, nitrocellulose, and ethylhydroxyethylcellulose; other resins such as polyurethane resin, polyamide resin, polyester resin, polycarbonate resin, phenoxy resin, phenol resin, and epoxy resin; and various elastomers. These may be used alone, or two or more thereof may be used in the form of a mixture or copolymer thereof.

(Dye)

The dye used in the present invention is not particularly limited, as long as it is able to diffuse by heat and able to be incorporated in the heat-sensitive transfer sheet, and able to transfer by heat from the heat-sensitive transfer sheet to the image-receiving sheet. As the dye used for the heat-sensitive transfer sheet, ordinarily used dyes or known dyes can be used.

Preferable examples of the dye include diarylmethane-series dyes, triarylmethane-series dyes, thiazole-series dyes, methine-series dyes such as merocyanine; azomethine-series dyes typically exemplified by indoaniline, acetophenoneazomethine, pyrazoloazomethine, imidazole azomethine, imidazo azomethine, and pyridone azomethine; xanthene-series dyes; oxazine-series dyes; cyanomethylene-series dyes typically exemplified by dicyanostyrene, and tricyanostyrene; thiazine-series dyes; azine-series dyes; acridine-series dyes; benzene azo-series dyes; azo-series dyes such as pyridone azo, thiophene azo, isothiazole azo, pyrrol azo, pyralazo, imidazole azo, thiadiazole azo, triazole azo, and disazo; spiropyran-series dyes; indolinospiropyran-series dyes; fluoran-series dyes; rhodaminelactam-series dyes; naphthoquinone-series dyes; anthraquinone-series dyes; and quinophthalon-series dyes.

Specific examples of a yellow dye that can be used in the present invention include Disperse Yellow 231, Disperse Yellow 201 and Solvent Yellow 93. Specific examples of a magenta dye that can be used in the present invention include Disperse Violet 26, Disperse Red 60, and Solvent Red 19. Specific examples of a cyan dye that can be used in the present invention include Solvent Blue 63, Solvent Blue 36, Disperse Blue 354 and Disperse Blue 35. As a matter of course, it is also possible to use suitable dyes other than these dyes as exemplified above. Further, dyes each having a different hue from each other as described above may be arbitrarily combined together.

In the heat-sensitive transfer sheet, it is possible to dispose a dye barrier layer between the dye layer and the support.

The surface of the support may be subjected to treatment for easy adhesion to improve wettability and an adhesive property of the coating liquid. Examples of the treatment include known resin surface modifying treatments such as corona discharge treatment, flame treatment, ozone treatment, ultraviolet treatment, radial ray treatment, surface-roughening treatment, chemical agent treatment, vacuum plasma treatment, atmospheric plasma treatment, primer treatment, grafting treatment, and the like.

An easy adhesion layer (easily-adhesive layer) may be formed on the support by coating. Examples of the resin used in the easily-adhesive layer include polyester-series resins, polyacrylate-series resins, polyvinyl acetate-series resins, vinyl-series resins such as polyvinyl chloride resin and polyvinyl alcohol resin, polyvinyl acetal-series resins such as polyvinyl acetoacetal and polyvinyl butyral, polyether-series resins, polyurethane-series resins, styrene acrylate-series resins, polyacrylamide-series resins, polyamide-series resins, polystyrene-series resins, polyethylene-series resins, and polypropylene-series resins.

When the film (layer) used for the support is formed by melt extrusion, it is allowable to subject a non-stretched film to coating treatment followed by stretching treatment.

The above-mentioned treatments may be used in combination of two or more thereof.

[White Layer (White Transfer Layer)]

A white layer used in the heat-sensitive transfer sheet is constituted to include a white pigment intended to impart appropriate white concealability and light diffusibility to the printed matter after transfer, and a binder resin. It is preferable to provide a peeling layer between the white layer and the support. Furthermore, an adhesive layer may be provided on the white layer. Here, if the white layer is transferred onto a pseudo-image without being mediated by the adhesive layer, a conventionally known binder resin having adhesiveness may be used, or an adhesive may be incorporated into the white layer. Regarding the white pigment, typical white pigments as well as filler materials can be used. Therefore, the white pigment as used herein includes filler materials.

The white pigment consists of hard solid particles, and examples that can be used include white pigments such as titanium oxide or zinc oxide; inorganic fillers such as silica, alumina, clay, talc, calcium carbonate, barium sulfate; and resin particles (plastic pigments) of an acrylic resin, an epoxy resin, a polyurethane resin, a phenolic resin, a melamine resin, a benzoguanamine resin, a fluororesin, a silicone resin, and the like. Titanium oxide includes rutile titanium oxide and anatase titanium oxide, but any of them may be used.

Any conventionally known binder resin can be used, but preferred examples include an acrylic resin, a cellulose-series resin, a polyester-series resin, a vinyl-series resin, a polyurethane-series resin, a polycarbonate-series resin, and partially crosslinked resins thereof.

To the white layer, a fluorescent whitening agent, in addition to the white pigment and the binder resin can be added. Known compounds having a fluorescent whitening effect, such as a stilbenzene-series compound and a pyrazoline-series compound, can be used as the fluorescent whitening agent. Furthermore, a small amount of colorant may also be incorporated into the white layer.

The white layer is such that when a lenticular lens sheet printed matter to which the white layer has been transferred is viewed under a transmitted light coming from a backlight, the white layer needs to have appropriate light diffusibility and light transmissibility. On the other hand, when the lenticular lens sheet printed matter to which the white layer has been transferred is viewed under a reflected light coming from the front direction, the white layer needs to have appropriate light diffusibility and light reflectability. In the case of the latter, the total light ray transmittance of the white layer after transfer is preferably 60% or less, and particularly in the case of forming pseudo-images which may serve as a continuous image, the total light ray transmittance is preferably 50% or less.

In order to adjust the total light ray transmittance of the white layer after transfer to 60% or less and to impart thereby sufficient white concealability, it is preferable to set the ratio of a binder resin (A) and a white pigment (B) that constitute the white layer, in the range of A/B=1/1 to 1/10. It is particularly preferable to set the lower limit of this amount ratio at 1/1.5, and the upper limit at 1/6. The ratio of A/B is appropriately set in the range described above, depending on the material of the support sheet having a lenticular lens or the receptor layer, to which the white layer is transferred. If the ratio A/B is larger than 1/1, the total light transmittance may exceed 60%, and the white concealability may be decreased. Furthermore, if the white pigment is incorporated in a large amount and the ratio A/B is smaller than 1/10, film coatability deteriorates. Thus, abrasion properties may be deteriorated, or adhesiveness may be deteriorated due to the decrease of the resin content.

The thickness of the white layer is adjusted to about 0.5 to 10 μm.

Measurement of the total light ray transmittance is carried out as stipulated in JIS K 7105. An excellent printed matter can be formed by setting up the ratio A/B and the thickness of the white layer such that the total light ray transmittance of the white layer transfer section of the heat-sensitive transfer sheet is 60% or less, and preferably 50% or less.

[Peeling Layer]

A peeling layer used in the heat-sensitive transfer sheet constitutes a white layer transfer section together with the white layer, and is formed between the support film and the white layer. The peeling layer is provided to prevent fusion between the heat-sensitive transfer sheet and the lenticular lens sheet, and to facilitate the transfer of the white layer on the receptor layer provided on the lenticular lens sheet without causing any transfer unevenness.

As the peeling layer, for example, a releasable peeling layer that separates from the interface between the peeling layer and the base film (support), or a cohesive peeling layer that causes cohesion failure within the peeling layer and thereby separates from the base film, can be formed.

The releasable peeling layer can be constructed by adding a releasable material to the binder resin, according to the necessity. Examples of the binder resin that can be used include thermoplastic resins, for example, acrylic resins such as polymethyl methacrylate, polyethyl methacrylate and polybutyl acrylate; vinyl-series resins such as polyvinyl acetate, vinyl chloride-vinyl acetate copolymers, polyvinyl alcohol, and polyvinyl butyral; and cellulose derivatives such as ethyl cellulose, nitrocellulose, and cellulose acetate; or thermosetting resins, for example, unsaturated polyester resins, polyester resins, polyurethane-series resins, aminoalkyd resins, and the like. The releasable peeling layer can be constructed from a composition containing one kind or two or more kinds of these resins.

Other examples of the releasable material that can be used include resins having releasability, such as waxes, silicone waxes, silicone oils, silicone-series resins, melamine resins, and fluororesins; lubricants such as talc, silica microparticles, surfactants and metal soaps; and the like.

The releasable peeling layer can also be constructed from a resin having releasability. In this case, a silicone-series resin, a melamine resin, a fluororesin and the like can be used, and a graft polymer produced by grafting a releasable segment such as a polysiloxane segment and a fluorinated carbon segment into the molecule of a resin such as an acrylic resin, a vinyl-series resin and a polyester resin, may be used as well. The releasable peeling layer can also be constructed from a composition containing one kind or two or more kinds of the resins mentioned above. The releasable peeling layer may further contain, in addition to the materials described above, a conventionally known fluorescent whitening agent having an effect of a fluorescent whitening of image, such as a stilbenzene-series compound and a pyrazoline-series compound.

The cohesive failing peeling layer causes so-called cohesive failure in the middle part of the peeling layer in the thickness direction when the white layer transfer section is transferred onto the receptor layer, and a portion of the peeling layer remains on the base film without being peeled off, and the other portion is transferred onto the printed matter. When the cohesive failing peeling layer peels off and migrates onto the lenticular lens sheet, the concavo-convex shape of the cohesively failed surface is formed on the uppermost surface of the printed matter. When the printed matter is viewed under a transmitted light coming from a backlight, the concavo-convex formed on the uppermost surface of the printed matter diffuses and reflects the illuminated light. This supplements the light diffusibility of the white layer, and thus a printed matter with good visual quality, which has both satisfactory light diffusibility and light transmissibility, can be formed.

As the materials for forming the cohesive failing peeling layer, a binder resin and a releasable material that is added according to the necessary are used. Examples of the binder resin that can be used include one kind or two or more kinds of resins selected from thermoplastic resins, for example, acrylic resins such as polymethyl methacrylate, polyethyl methacrylate and polybutyl acrylate; vinyl-series resins such as polyvinyl acetate, vinyl chloride-vinyl acetate copolymers, polyvinyl alcohol, and polyvinyl butyral; cellulose derivatives such as ethyl cellulose, nitrocellulose, and cellulose acetate; polyester resins, polyurethane resins, and the like. It is preferable that these binder resins include a resin having a Tg or a softening point of 100° C. or higher, so as to prevent fusion with the support sheet at the time of heat transfer. Furthermore, a resin having a Tg or a softening point of below 100° C. can also be used, if combined with an appropriate releasable material.

Examples of the releasable material that can be used include waxes, inorganic microparticles of talc, silica and the like, and organic microparticles. The releasable material is preferably added in an amount of 0.1 to 200% by mass, and more preferably 10 to 100% by mass, relative to the amount of the binder resin.

In the case where the releasable material is not used in the cohesive failing peeling layer, two or more kinds of resins that have low compatibility with each other among the binder resins mentioned above can be used so that the peeling layer can be peeled off at the interface between the binder resins that form the peeling layer.

The white concealability of the printed matter can be enhanced by incorporating a white pigment into the peeling layer. For example, in the case where the white concealability is insufficient, a printed matter having sufficient white concealability can be obtained by incorporating the white pigment into the white layer as well as the peeling layer, and thereby adjusting the total light ray transmittance at the white layer and the peeling layer to 60% or less.

Furthermore, in the case where it is wished to impart adhesiveness to the white layer, or to enhance adhesiveness of the white layer, an adhesive binder resin can be incorporated into the white layer. However, in this case, the proportion of the white pigment is correspondingly decreased, and white concealability may become insufficient. In order to supplement such white concealability of the white layer, the white pigment can be incorporated into the peeling layer, and thus a printed matter having sufficient white concealability can be obtained.

For the white pigment that incorporated into the peeling layer, titanium oxide, zinc oxide or the like can be used as described above. The content of the white pigment cannot be defined in a simple manner because the content is defined on the basis of the relationship with the white concealability of the white layer. However, in the case where the white pigment is added to the peeling layer, the addition amount is usually 100 to 500% by mass, while the upper limit is preferably about 300% by mass, and the lower limit is about 200% by mass, to the amount of the binder resin that constitutes the peeling layer.

The releasable or cohesive failing peeling layer as discussed above may also be added with an ultraviolet absorbent for enhancing the weather resistance performance, an oxidation inhibitor, a fluorescent whitening agent (stilbenzene-series, pyrazoline-series compound, and the like) and the like, in addition to the materials described above.

The peeling layer can be formed by the same method as that used for the dye layer, and the thickness of the peeling layer is preferably 0.1 to 5.0 µm as obtained after coating and drying.

In regard to the white layer and the peeling layer, those layers described in Japanese Patent No. 3789033 are preferably used.

[Adhesive Layer]

An adhesive layer may be provided on the white layer. A preferably applicable adhesive layer is the adhesive layer for the heat-transferable protective layer that will be described below.

[Heat Resistant Lubricating Layer]

In the heat-sensitive transfer sheet, it is preferred to dispose a heat-resistant lubricating layer (back side layer) at the surface (back side) opposite to the dye layer coating side of the support, namely on the side of the support with which a thermal head etc. contacts. Further, in the case of a white layer transfer sheet and protective layer transfer sheet, it is also preferred to dispose the heat-resistant lubricating layer on the side of the support with which the thermal head etc. contacts.

If the heat-sensitive transfer sheet is heated by a heating device such as a thermal head in the state such that the back side of the support of the heat-sensitive transfer sheet directly contacts with the heating device, heat seal is apt to occur. In addition, owing to a large friction between them, it is difficult to smoothly transfer the heat-sensitive transfer sheet at the time of printing.

The back side layer is disposed so as to enable the heat-sensitive transfer sheet to withstand heat energy from the thermal head. The heat-resistant lubricating layer prevents the heat seal, and enables a smooth travel action. Recently, the necessity of the heat-resistant lubricating layer is becoming greater on account that the heat energy from the thermal head is increasing in association with speeding-up of the printer.

The heat-resistant lubricating layer is formed by coating a binder to which a sliding agent, a release agent, a surfactant, inorganic particles, organic particles, pigments, and the like are added. Further, an intermediate layer may be disposed between the back side layer and the support. As the intermediate layer, there has been known a layer containing inorganic fine particles and a water-soluble resin or a hydrophilic resin capable of emulsification.

As the binder, a known resin having high heat-resistance may be used. Examples thereof include cellulose resins such as ethylcellulose, hydroxycellulose, hydroxypropylcellulose, methylcellulose, cellulose acetate, cellulose acetate butyrate, cellulose acetate propionate, and nitrocellulose; vinyl-series resins such as polyvinyl alcohol, polyvinyl acetate, polyvinyl butyral, polyvinyl acetal, polyvinyl acetoacetal resin, vinyl chloride-vinyl acetal copolymer and polyvinyl pyrrolidone; acrylic resins such as methyl polymethacrylate, ethyl polyacrylate, polyacrylamide, and acrylonitrile-styrene copolymer; and natural or synthetic resins such as polyamide resin, polyimide resin, polyamideimide resin, polyvinyl toluene resin, coumarone indene resin, polyester-series resin, polyurethane resin, polyether resin, polybutadiene resin, polycarbonate resin, chlorinated polyolefin resin, fluorine-contained resin, epoxy resin, phenol resin, silicone resin, silicone-modified or fluorine-modified urethane. These may be used alone or in the mixture thereof.

In order to enhance heat resistance of the heat-resistant lubricating layer, there have been known techniques of cross-linking resins by ultraviolet ray or electron beam radiation.

Further, the resin may be cross-linked by heating with a cross-linking agent. According to need, a catalyst may be added to the resin. As the exemplary cross-linking agent, polyisocyanate, and the like are known. When the polyisocyanate is used, a resin with a hydroxyl group-based functional group is suited to be cross-linked. JP-A-62-259889 discloses a back side layer formed of a reaction product of polyvinyl butyral and an isocyanate compound, to which a bulking agent such as an alkali metal salt or alkaline earth metal salt of phosphoric ester and potassium carbonate is added. JP-A-6-99671 discloses that a heat resistant lubricating layer-forming high molecular compound can be obtained by reacting a silicone compound having an amino group and an isocyanate compound having two or more isocyanate groups in one molecule.

In order to sufficiently exhibit the function, the back side layer may be incorporated with additives such as a sliding agent, a plasticizer, a stabilizer, a bulking agent, and a filler for removing materials adhered to the head.

Examples of the sliding agent include fluorides such as calcium fluoride, barium fluoride, and graphite fluoride; sulfides such as molybdenum disulfide, tungsten disulfide, and iron sulfide; oxides such as lead oxide, alumina, and molybdenum oxide; solid sliding agents composed of inorganic compounds such as graphite, mica, boron nitride, and clays (e.g., talc, acid clay); organic resins such as fluorine resins and silicone resins; silicone oil; metal soaps such as metal salt of stearic acid; various kinds of waxes such as polyethylene wax and paraffin wax; and surfactants such as anionic surfactants, cationic surfactants, amphoteric surfactants, nonionic surfactants, and fluorine surfactants.

It is also possible to use phosphoric ester surfactants such as zinc salt of alkyl phosphoric monoester or alkyl phosphoric diester. However, the acid group of the phosphate causes a disadvantage such that the phosphate decomposes as a heat quantity from a thermal head becomes large, and consequently the pH of the back side layer reduces, corrosive abrasion of the thermal head becomes heavier. As a measure to deal with the disadvantage, there are known, for example, a method of using a neutralized phosphate surfactant, and a method of using a neutralizing agent such as magnesium hydroxide.

Examples of the other additives include higher fatty acid alcohols, organopolysiloxane, organic carboxylic acids and derivatives thereof, and fine particles of inorganic compounds such as talc and silica.

The heat-resistant lubricating layer is formed by adding additives to the binder exemplified above, dissolving or dispersing the resultant into a solvent to prepare a coating liquid, and then applying the coating liquid by a known method such as gravure coating, roll coating, blade coating, or wire bar coating. The film thickness of the heat-resistant lubricating layer is preferably from 0.1 to 10 µm, more preferably from 0.5 to 5 µm.

<Image-Forming Method>

In the image-forming method using the heat-sensitive transfer image-receiving sheet of the present invention, imaging is formed by superposing the heat-sensitive transfer sheet on the heat-sensitive transfer image-receiving sheet in the present invention so that the dye layer (colorant layer) of the heat-sensitive transfer sheet is in contact with the receptor layer of the heat-sensitive transfer image-receiving sheet, and giving thermal energy in accordance with image signals given from the thermal head. Specifically, an image-forming may be conducted in a similar manner as described in, for example, JP-A-2005-88545.

In regard to stereoscopic images, it is necessary to print the image at a precise position in accordance with the concavo-convex of the lenticular lens. In connection with this method, the method described in Japanese Patent No. 3609065 or the like can be used.

The heater length of the thermal head used in the present invention is 45 µm or less. Herein, the heater length refers to a length of a portion of a heater element, in which the portion is not covered with an electrode and the length is parallel to a direction of heat-sensitive transfer image-receiving sheet movement. In the case of using a printer which is capable of recording a 3D image data with a thermal head on a lenticular sheet, high resolution in a vertical scanning direction is required in order to print a multi-view image on the lenses arranged in the vertical scanning direction. The heater length is preferably in the range of from 30 µm to 45 µm. If the heater length is more than 45 µm, a high-definition image may not be obtained. In contrast, if the heater length is too small, wrinkling or the like may occur at the time of printing, which makes it difficult to stably supply a high-definition image.

<Printing Equipment>

As for the printing equipment, for example, an equipment as described in Japanese patent application No 2010-17078, namely an equipment including a print pitch calculation unit for calculating a print pitch of each segmented image on the basis of a lens pitch of a lenticular lens; a reference position determination unit for determining a reference position to align a phase of the lens pitch with a phase of the print pitch; a recording position determination unit for determining a recording position of each segmented image on the basis of the reference position and the print pitch; and a recording unit for recording the each segmented image at the recording position, or an equipment as described in Japanese patent application No 2010-19000, namely an equipment including a ribbon replacement Gatling system; a ribbon detection unit; and a ribbon cue unit; and a control unit for controlling these units, is preferably used in the present invention.

Further, printer equipments (a rotation-pancratic ribbon cage holder; a rotation-pancratic platen roller; a misalignment calculation unit; a conveyance amount-compensating unit; an unit for detecting an angle of a lenticular lens at a main scanning direction and its compensation unit; a postural adjustment of lenticular lens and its control unit; and a paper feeding unit) as described in Japanese patent application Nos. 2010-17104, 2010-17105, 2010-17106, 2010-18707, 2010-18708 and 2010-18709, are preferably used.

The present invention is contemplated for providing a heat-sensitive transfer image-receiving sheet and an image forming method which is able to stably print a high-definition three dimensional image with reduced image troubles at the time of printing.

According to the present invention, it is possible to provide an image forming method which is able to stably print a high-definition three dimensional image with reduced image troubles at the time of printing, such as wrinkling and a shift of the register in the color printing.

EXAMPLES

The present invention will be described in more detail based on the following examples. Any materials, reagents, amount and ratio of use and operations, as shown in the examples, may appropriately be modified without departing from the spirit and scope of the present invention. It is therefore understood that the present invention is by no means intended to be limited to the specific examples below. In the following Examples, the terms "part" and "%" are values by mass, unless they are indicated differently in particular.

Example 1

Synthesis of Polyether-Modified Silicone

Synthesis of the polyether-modified silicone represented by formula (S1) used in the present invention can be carried out using the known methods described in Kunio Itoh, "Silicone Handbook" (Nikkan Kogyo Shimbun Co., Ltd., 1990, p. 163) and the like.

Specifically, in a glass flask equipped with a stirring device and a thermometer, 20 parts by mass of a dimethylsiloxane-methyl hydrogen siloxane copolymer represented by the average structural formula (1):

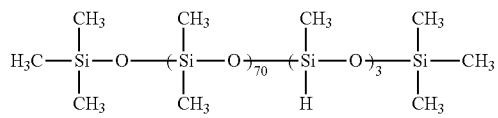

and 40 parts by mass of single-terminal allyl etherified polyoxyalkylene represented by the average structural formula (2): $CH_2\!=\!CHCH_2O(C_2H_4O)_{20}(C_3H_6O)_{20}CH_3$ were mixed, and 20 parts by mass of isopropyl alcohol was added as a solvent. Furthermore, chloroplatinic acid was added thereto. After the mixture was stirred for 2 hours at 86° C., it was confirmed that the peak representing Si—H in the infrared absorption spectrum disappeared. The mixture was further stirred for 30 minutes. The reaction liquid was concentrated under reduced pressure, and thereby a polyether-modified silicone S1-1 shown in Table 1 below was obtained.

A polyether-modified silicone S1-2 shown in Table 1 below was obtained in the same manner as the polyether-modified silicone S1-1, except that the structure of the single-terminal allyl etherified polyoxyalkylene was changed to the average structural formula (3): $CH_2\!=\!CHCH_2O(C_2H_4O)_{35}CH_3$.

A polyether-modified silicone S1-3 shown in Table 1 below was obtained in the same manner as the polyether-modified silicone S1-1, except that the structure of the single-terminal allyl etherified polyoxyalkylene was changed to the average structural formula (4): $CH_2\!=\!CHCH_2O(C_2H_4O)_{10}CH_3$.

A polyether-modified silicone S1-4 shown in Table 1 below was obtained in the same manner as the polyether-modified silicone S1-1, except that the structure of the single-terminal allyl etherified polyoxyalkylene was changed to the average structural formula (5): $CH_2\!=\!CHCH_2O(C_2H_4O)_{50}(C_3H_6O)_{50}CH_3$.

A polyether-modified silicone S1-5 shown in Table 1 below was obtained in the same manner as the polyether-modified silicone S1-1, except that the structure of the single-terminal allyl etherified polyoxyalkylene was changed to the average structural formula (6): $CH_2\!=\!CHCH_2O(C_2H_4O)_{40}(C_3H_6O)_{35}CH_3$.

TABLE 1

| Polyether-modified silicone | a1 | b1 |
| --- | --- | --- |
| Polyether-modified silicone S1-1 | 20 | 20 |
| Polyether-modified silicone S1-2 | 35 | 0 |
| Polyether-modified silicone S1-3 | 10 | 0 |

TABLE 1-continued

| Polyether-modified silicone | a1 | b1 |
| --- | --- | --- |
| Polyether-modified silicone S1-4 | 50 | 50 |
| Polyether-modified silicone S1-5 | 40 | 35 |

| Receptor layer coating liquid 1 | |
| --- | --- |
| Vinyl chloride/acrylic copolymer latex (trade name: Vinybran 900, manufactured by Nissin Chemicals Co., Ltd., solid content: 40%) | 20.0 mass parts |
| Vinyl chloride/acrylic copolymer latex (trade name: Vinybran 690, manufactured by Nissin Chemicals Co., Ltd., solid content: 55%) | 20.0 mass parts |
| Gelatin (10% solution) | 2.0 mass parts |
| Polyvinylpyrrolidone (trade name: K-90, manufactured by ISP Japan Ltd.) | 0.5 mass part |
| The above-described polyether-modified silicone S1-4 (100%) | 1.5 mass parts |
| Anionic surfactant A1-1 | 0.5 mass part |
| Water | 50.0 mass parts |

(Production of Sample 101)

A sample 101 was produced by the following procedure.

(1) A biaxially stretched polyethylene terephthalate (PET) film (manufactured by Fujifilm Corp.) having the thickness of 188 μm was used as a transparent support, and the PET film (thickness 188 μm) which was miming at a rate of 10 m/min was inserted between a mirror-surface roller (φ 350 mm, surface temperature 15° C.) and a nip roller. A glycol-modified polyethylene terephthalate resin PETG (manufactured by SK Chemicals Corp.) and an adhesive resin (trade name: ADMER, manufactured by Mitsubishi Chemical Corp.) were co-extruded from a T-die (ejection width 350 mm) set up at a temperature of 280° C., at a measured resin temperature of 260 to 280° C., and were supplied between the PET film and the mirror-surface roller. Thus, a sheet having a subbing layer (thickness 220 μm) formed thereon was rolled up by a rolling step.

(2) The receptor layer coating liquid 1 described above was coated on the subbing layer by the method exemplified in FIG. 9 illustrated in U.S. Pat. No. 2,761,791, in an amount of 2.5 g/m², and thus a receptor layer was provided by coating.

(3) The resin sheet provided with the subbing layer and the receptor layer thereon was wound off at a rate of 10 m/min in a conveyance step, and was inserted between an embossed roller (φ 350 mm, 40° C.) having a lenticular lens shape (radius 150 μm, lens height 70 μm, pitch 254 μm) and a nip roller. A glycol-modified polyethylene terephthalate resin PETG (manufactured by SK Chemicals Corp.) and the adhesive resin (trade name: ADMER, manufactured by Mitsubishi Chemical Corp.) were co-extruded from a T-die (ejection width 330 mm) set up at a temperature of 280° C., at a measured resin temperature of 260 to 280° C., and were supplied between the resin sheet and the embossed roller to be laminated. Thus, a lenticular sheet (thickness 340 μm) could be obtained. In the below-described Table 2, the lenticular resin layer itself and the adhesive resin layer (average thickness: 20 μm) of the lenticular layer were referred to as an upper layer and a lower layer, respectively. In the same manner, the subbing layer itself and the adhesive resin layer (average thickness: 10 μm) of the subbing layer were referred to as an upper layer and a lower layer, respectively.

(Production of Samples 102 to 105)

Samples 102 to 105 were produced in the same manner as the sample 101, except that the glycol-modified polyethylene terephthalate (PETG) resin used in the subbing layer and the lenticular lens was changed to a polyethylene (PE) resin or the like as indicated in Table 2 shown below.

When a polyethylene resin (trade name: SUMIKASEN L405, manufactured by Sumitomo Chemical Co., Ltd.) was used, the T-die temperature was set up at 290° C., and the measured resin temperature was adjusted to 270 to 290° C.

(Production of Samples 106 and 107)

Samples 106 and 107 were produced in the same manner as the samples 101, except that VINIBRAN, which was the vinyl chloride/acrylic copolymer latex polymer of the receptor layer coating liquid 1, was changed to VYLONAL MD1100 (trade name, manufactured by Toyobo Co., Ltd.) or VYLONAL MD1480 (trade name, manufactured by Toyobo Co., Ltd.), which were both polyester latexes, as indicated in the Table 2 shown below.

As an indicator of hardness, an automatic micro-Vickers hardness tester (trade name: HMV-FA, manufactured by Shimadzu Corporation) was used, in which the Vickers indenter was changed to a spherical indenter having a diameter of 0.2 mm, and the indenter was put on a sample and then the sample was subjected to weight bearing of 200 mN over a period of 10 seconds, and thereafter the weight was reduced to 0 over a period of 10 seconds. A maximum amount of displacement (μm) of the sample at this time was measured.

| Coating liquid for heat resistant lubricating layer | |
|---|---|
| Acrylic-series polyol resin (trade name: ACRYDIC A-801, manufactured by Dainippon Ink and Chemicals, Incorporated) | 26.0 mass parts |
| Zinc stearate (trade name: SZ-2000, manufactured by Sakai Chemical Industry Co., Ltd.) | 0.43 mass part |
| Phosphate (trade name: PLYSURF A217, manufactured by Dai-ichi Kogyo Seiyaku Co., Ltd.) | 1.27 mass parts |
| Isocyanate (50% solution) (trade name: BURNOCK D-800, manufactured by Dainippon Ink and Chemicals, Incorporated) | 8.0 mass parts |
| Methyl ethyl ketone/toluene (2/1, at mass ratio) | 64 mass parts |
| Yellow-dye-layer-coating liquid | |
| The following yellow dye | 7.8 mass parts |
| Polyvinylacetal resin (trade name: S-LEC KS-1, manufactured by Sekisui Chemical Co., Ltd.) | 6.1 mass parts |
| Polyvinylbutyral resin (trade name: DENKA BUTYRAL #6000-C, manufactured by DENKI KAGAKU KOGYOU K. K.) | 2.1 mass parts |
| Releasing agent (trade name: X-22-3000T, manufactured by Shin-Etsu Chemical Co., Ltd.) | 0.05 mass part |
| Releasing agent (trade name: TSF4701, manufactured by MOMENTIVE Performance Materials Japan LLC.) | 0.03 mass part |

TABLE 2

| Sample No. | Lenticular layer Upper layer | Lenticular layer Lower layer | Subbing layer Upper layer | Subbing layer Lower layer | Receptor layer | Displacement amount of spherical indenter hardness (μm) | Remarks |
|---|---|---|---|---|---|---|---|
| 101 | PETG | ADMER | PETG | ADMER | Vinyl chloride/acrylic latex copolymer | 3.5 | This invention |
| 102 | PETG | ADMER | None | None | Vinyl chloride/acrylic latex copolymer | 2.5 | Comparative example |
| 103 | PETG | ADMER | PETG | None | Vinyl chloride/acrylic latex copolymer | 2.5 | Comparative example |
| 104 | PETG | ADMER | PE | None | Vinyl chloride/acrylic latex copolymer | 4 | Comparative example |
| 105 | PE | ADMER | PE | ADMER | Vinyl chloride/acrylic latex copolymer | 4 | This invention |
| 106 | PETG | ADMER | PETG | ADMER | Polyester (trade name: Vylonal MD1100, manufactured by Toyobo Co., Ltd.) | 3.5 | This invention |
| 107 | PETG | ADMER | PETG | ADMER | Polyester (trade name: Vylonal MD1480, manufactured by Toyobo Co., Ltd.) | 3.5 | This invention |

The displacement of spherical indenter hardness of the transparent support was 2.5 μm.

(Production of Heat-Sensitive Transfer Sheet)

A polyester film having the thickness of 6.0 μm (trade name: Diafoil 1(200E-6F, manufactured by MITSUBISHI POLYESTER FILM CORPORATION), that was subjected to an easy-adhesion-treatment on one surface of the film, was used as a support. The following heat resistant lubricating layer coating liquid was applied on the other surface of the support that was not subjected to the easy-adhesion-treatment, so that the coating amount based on the solid content after drying would be 1 g/m². After drying, the coating liquid was cured by heat at 60° C.

Coating liquids, which will be detailed later, were used to form, onto the easily-adhesive layer coated surface of the thus-formed polyester film, individual dye layers in yellow, magenta and cyan in area order by coating. In this way, a heat-sensitive transfer sheet was produced. The solid coating amount in each of the dye layers was set to 0.8 g/m².

-continued

| | |
|---|---|
| Matting agent (trade name: Flo-thene UF, manufactured by Sumitomo Seika Chemicals Co., Ltd.) | 0.15 mass part |
| Methyl ethyl ketone/toluene (2/1, at mass ratio) | 84 mass parts |
| Magenta-dye-layer-coating liquid | |
| The following magenta dye | 7.8 mass parts |
| Polyvinylacetal resin (trade name: S-LEC KS-1, manufactured by Sekisui Chemical Co., Ltd.) | 8.0 mass parts |
| Polyvinylbutyral resin (trade name: DENKA BUTYRAL #6000-C, manufactured by DENKI KAGAKU KOGYOU K. K.) | 0.2 mass part |
| Releasing agent (trade name: X-22-3000T, manufactured by Shin-Etsu Chemical Co., Ltd.) | 0.05 mass part |
| Releasing agent (trade name: TSF4701, manufactured by MOMENTIVE Performance Materials Japan LLC.) | 0.03 mass part |

| | |
|---|---|
| Matting agent (trade name: Flo-thene UF, manufactured by Sumitomo Seika Chemicals Co., Ltd.) | 0.15 mass part |
| Methyl ethyl ketone/toluene (2/1, at mass ratio) | 84 mass parts |

Cyan-dye-layer-coating liquid

| | |
|---|---|
| The following cyan dye | 7.8 mass parts |
| Polyvinylacetal resin (trade name: S-LEC KS-1, manufactured by Sekisui Chemical Co., Ltd.) | 7.4 mass parts |
| Polyvinylbutyral resin (trade name: DENKA BUTYRAL #6000-C, manufactured by DENKI KAGAKU KOGYOU K. K.) | 0.8 mass part |
| Releasing agent (trade name: X-22-3000T, manufactured by Shin-Etsu Chemical Co., Ltd.) | 0.05 mass part |
| Releasing agent (trade name: TSF4701, manufactured by MOMENTIVE Performance Materials Japan LLC.) | 0.03 mass part |
| Matting agent (trade name: Flo-thene UF, manufactured by Sumitomo Seika Chemicals Co., Ltd.) | 0.15 mass part |
| Methyl ethyl ketone/toluene (2/1, at mass ratio) | 84 mass parts |

Yellow dye

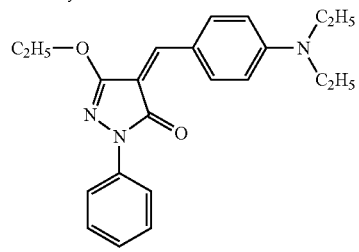

Magenta dye

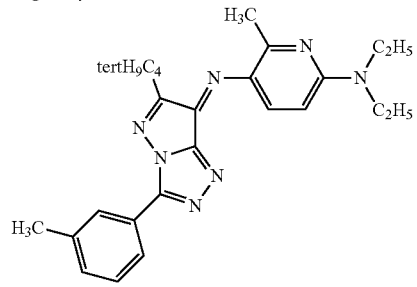

Cyan dye

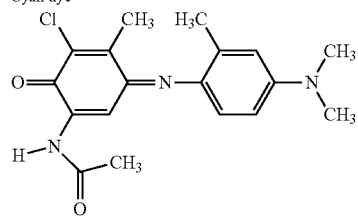

A transferable white layer laminate was formed by applying a peeling layer coating liquid and a white layer coating liquid having compositions as shown below on the same polyester film as that was used in the production of the dye layer, according to the method described in Japanese Patent No. 3789033. The coating amount at the time of film drying was set at 0.6 g/m² for the peeling layer and 2.0 g/m² for the white layer.

Coating liquid for peeling layer

| | |
|---|---|
| Acrylic resin (trade name: LP-45M, manufactured by Soken Chemical Co., Ltd.) | 16 mass parts |
| Polyethylene wax (average particle size: about 1.1 μm) | 8 mass parts |
| Toluene | 76 mass parts |

Coating liquid for white layer

| | |
|---|---|
| Modified acrylic resin (trade name: ACRYDICK BZ-1160, manufactured by Dainippon Ink Co., Ltd.) | 20 mass parts |
| Anatase-type titanium oxide (trade name: TCA888, manufactured by Tochem Products Co., Ltd.) | 40 mass parts |
| Fluorescent whitening agent (trade name: UVITEX OB, manufactured by Ciba-Geigy Corp.) | 0.3 mass part |
| Toluene/isopropyl alcohol (1/1, at mass ratio) | 40 mass parts |

(Image Forming Method)

In the printer for forming images, a thermal head having a heater length of 42 μm was used according to a method described in, for example, JP-A-2000-94729. Images were output under the setup condition in which gray gradation was able to be obtained all over the range of from the lowest density to the highest density. Further for three-dimensional images, six-view images were printed onto a lens with 100 Lpi pitch.

(Evaluation of Dmax)

The visual density of the black image obtained in the above condition was measured by Photographic Densitometer (trade name, manufactured by X-Rite Incorporated).

(Evaluation of Transfer Failure)

With respect to each sample, twenty copies of a 2L-size image in which the black image at the above-described Dmax portion and a white image are equally shared were continuously printed. The number of wrinkling troubles having been generated on the image was counted.

Further, a level of a shift of the register in the color printing on the print was visually evaluated.

Score 5: there was no image which caused a shift of the register in the color printing.

Score 4: a copy number of the image which caused a shift of the register in the color printing was less than 3.

Score 3: a copy number of the image which caused a shift of the register in the color printing was 3 or more and 5 or less.

Score 2: a copy number of the image which caused a shift of the register in the color printing was 5 or more and 10 or less.

Score 1: a copy number of the image which caused a shift of the register in the color printing was 10 or more.

(Evaluation of Passage Failure)

For each of the samples, 1000 sheets of 2L-sized snapshot photographs were continuously printed, and the number of failures in which the printed paper was caught in the printer machine and the operation was stopped, was evaluated.

The obtained results are shown in Table 3 below.

The heat-sensitive transfer image-receiving sheet samples 101 and 105 to 107 in the present invention exhibited a remarkable effect that both wrinkling and the shift of the register in the color printing were reduced, compared to the results of the heat-sensitive transfer image-receiving sheet samples 102, 103 and 104 of the comparative examples. Further, by using the samples 101 and 105 to 107 in the present invention, passage troubles were reduced whereby prints were stably made. It could be seen that a high Dmax effect was obtained by using a vinyl chloride/acrylic copolymer as a latex polymer in the receptor layer.

TABLE 3

| Sample No. | Wrinkling (number/2 L 20 sheets) | Shift of register in color printing | Dmax | Passage failure (number of time/2 L, 1000 sheets) | Remarks |
|---|---|---|---|---|---|
| 101 | 2 | 5 | 2.03 | 0 | This invention |
| 102 | 18 | 2 | 2.00 | 30 | Comparative example |
| 103 | 15 | 2 | 2.03 | 30 | Comparative example |
| 104 | 3 | 4 | 2.03 | 5 | Comparative example |
| 105 | 2 | 5 | 2.03 | 2 | This invention |
| 106 | 2 | 5 | 1.75 | 2 | This invention |
| 107 | 2 | 5 | 1.71 | 2 | This invention |

Example 2

Samples 201 to 204 were produced in the same manner as the sample 101, except that the polyether-modified silicone S1-4 of the receptor layer coating liquid 1 was changed to equal masses of S1-1, S1-2, S1-3 and S1-5, respectively, and the same evaluation as that performed in the Example 1 was carried out. As a result, although there were some variations in the extent of the effect, all of the samples were recognized to have improving effects on the wrinkling, the shift of the register in the color printing, Dmax and passage failure. Furthermore, a sample 205 was produced in the same manner as the sample 101, except that the polyether-modified silicone S1-4 was not used, and the same evaluation was carried out. Thus, it was confirmed that using the polyether-modified silicone represented by formula (S1) boosts up these effects.

Example 3

Evaluation of each of samples 101 to 103 was performed in the same manner as in Example 1, except that the thermal head length used in Example 1 was changed to 100 μm. Samples 102 and 103 also generated wrinkles as low as 5 numbers/2 L 20 copies. However, these samples exhibited print quality lacking in definition.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2009-296233 filed in Japan on Dec. 25, 2009, and Patent Application No. 2010-33839 filed in Japan on Feb. 18, 2010, each of which is entirely herein incorporated by reference.

What we claim is:

1. A method of forming an image, comprising the steps of:
   superposing a heat-sensitive transfer sheet on a heat-sensitive transfer image-receiving sheet having a lenticular lens and at least one receptor layer on a transparent support; and
   applying thermal energy in accordance with image signals from a thermal head,
   wherein the heat-sensitive transfer image-receiving sheet has a subbing layer which contains a resin that is identical with at least one resin constituting the lenticular lens, on the side of the transparent support opposite to the side on which the lenticular lens is provided,
   wherein the heat-sensitive transfer image-receiving sheet has the receptor layer containing a latex polymer on the subbing layer and a spherical indenter hardness after the subbing layer and the receptor layer are provided is less than that of the transparent support itself, and
   wherein the thermal head has a heater length of 45 μm or less.

2. The method of forming an image according to claim 1, wherein said at least one resin that constitutes the lenticular lens and identical with the resin that constitutes the subbing layer is a polymethyl methacrylate resin, a polycarbonate resin, a polystyrene resin, a methacrylate-styrene copolymer resin, a polyethylene resin, a polyethylene terephthalate resin, or a glycol-modified polyethylene terephthalate resin.

3. The method of forming an image according to claim 1, wherein said at least one resin that constitutes the lenticular lens and identical with the resin that constitutes the subbing layer is a glycol-modified polyethyleneterephthalate resin.

4. The method of forming an image according to claim 1, wherein at least one of the latex polymer is a copolymer containing a vinyl chloride structure compound as a constituent component.

5. The method of forming an image according to claim 1, wherein at least one of the polymer latex is a vinyl chloride/acrylic acid ester copolymer.

6. The method of forming an image according to claim 1, wherein the transparent support is a polyethylene terephthalate resin.

7. The method of forming an image according to claim 1, wherein the lenticular lens is provided on an adhesive resin layer on the transparent support and the subbing layer is provided on an adhesive resin layer on the transparent support.

8. The method of forming an image according to claim 1, wherein the receptor layer contains the latex polymer and at least one polyether-modified silicone represented by formula (S1):

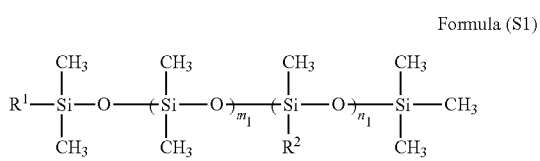

Formula (S1)

wherein $R^1$ represents an alkyl group; $R^2$ represents —X—$(C_2H_4O)_{a1}$—$(C_3H_6O)_{b1}$—$R^3$; $R^3$ represents a hydrogen atom, an acyl group, an alkyl group, a cycloalkyl group or an aryl group; X represents an alkylene group or an alkyleneoxy group; $m_1$ and $n_1$ each independently represents a positive integer; $a_1$ represents a positive integer; and $b_1$ represents 0 or a positive integer.

* * * * *